(12) United States Patent
Gagne et al.

(10) Patent No.: US 10,738,900 B2
(45) Date of Patent: Aug. 11, 2020

(54) VALVE ASSEMBLY WITH DIRECTIONAL FLOW PATH

(71) Applicant: ALPHINITY, LLC, Carson City, CA (US)

(72) Inventors: Michael C. Gagne, Carson City, NV (US); Steven V. Cates, Lakewood, CA (US); Dean C. Richards, Simi Valley, CA (US); Scott Bendon, Wales (GB)

(73) Assignee: ALPHINITY, LLC, Carson City, NV (US)

( * ) Notice: Subject to any disclaimer, the term of this patent is extended or adjusted under 35 U.S.C. 154(b) by 22 days.

(21) Appl. No.: 15/763,057

(22) PCT Filed: Sep. 30, 2016

(86) PCT No.: PCT/US2016/055016
§ 371 (c)(1),
(2) Date: Mar. 23, 2018

(87) PCT Pub. No.: WO2017/059370
PCT Pub. Date: Apr. 6, 2017

(65) Prior Publication Data
US 2018/0274689 A1    Sep. 27, 2018

Related U.S. Application Data

(60) Provisional application No. 62/236,007, filed on Oct. 1, 2015.

(51) Int. Cl.
*F16K 11/22* (2006.01)
*F16K 27/02* (2006.01)
(Continued)

(52) U.S. Cl.
CPC ............. *F16K 11/22* (2013.01); *F16K 7/06* (2013.01); *F16K 7/07* (2013.01); *F16K 27/003* (2013.01); *F16K 27/0236* (2013.01); *F16B 13/00* (2013.01)

(58) Field of Classification Search
CPC .... F16K 11/22; F16K 27/003; F16K 27/0236; F16K 7/06; F16K 7/07; F16B 13/00;
(Continued)

(56) References Cited

U.S. PATENT DOCUMENTS 2,825,524 A   3/1958 Fox
2,931,387 A   4/1960 Fleming
(Continued)

FOREIGN PATENT DOCUMENTS

CN    202778069 U    3/2013
DE    102004006889 B3    8/2005
(Continued)

OTHER PUBLICATIONS

Notification of First Office Action dated Apr. 1, 2019 in Chinese Application No. 2016800573087, (10 pages).
(Continued)

*Primary Examiner* — Jessica Cahill
(74) *Attorney, Agent, or Firm* — Vista IP Law Group LLP

(57) ABSTRACT

A valve assembly with a multidirectional flow path includes a valve body that includes respective hinged portions defining respective passageways extending through the valve body when in a closed state. A flexible conduit or tubing having a loop portion and a plurality of branches extending from the loop portion is at least partially positioned within the valve body. Portions of the loop that extend beyond the valve body are encapsulated by respective rigid jackets. Multiple valves are situated on the valve body and are used to selectively pinch the loop portion in different pinching
(Continued)

configurations to direct fluid to or from the particular branches. The valve assembly may be integrated into a manufacturing or other production process with optional additional jackets used to encapsulate the flexible conduit branches.

8 Claims, 18 Drawing Sheets

(51) Int. Cl.
    *F16K 7/07*         (2006.01)
    *F16K 7/06*         (2006.01)
    *F16K 27/00*       (2006.01)
    *F16B 13/00*       (2006.01)

(58) Field of Classification Search
    CPC ..... Y10T 137/87804; Y10T 137/87249; Y10T 137/87885; Y10T 137/87265; Y10T 137/87338; Y10T 137/87684; Y10T 137/87917; Y10T 137/97957; Y10T 137/877
    USPC .......................................................... 251/7
    See application file for complete search history.

(56) References Cited

U.S. PATENT DOCUMENTS

| | | | |
|---|---|---|---|
| 3,468,342 A | 9/1969 | Craft | |
| 3,559,683 A * | 2/1971 | Maguire | F16K 7/04 137/877 |
| 4,254,797 A | 3/1981 | Mayeaux | |
| 4,274,452 A | 6/1981 | Schmitt | |
| 4,457,339 A | 7/1984 | Juan et al. | |
| 4,618,114 A | 10/1986 | McFarland | |
| 4,895,341 A | 1/1990 | Brown | |
| 4,993,456 A | 2/1991 | Sule | |
| 5,197,708 A | 3/1993 | Campau | |
| 5,350,290 A | 9/1994 | Honings | |
| 5,402,823 A | 4/1995 | Cole | |
| 5,549,134 A | 8/1996 | Browne et al. | |
| 5,901,745 A | 5/1999 | Buchtel | |
| 5,906,223 A | 5/1999 | Pinkham | |
| 6,036,166 A | 3/2000 | Olson | |
| 6,068,751 A | 5/2000 | Neukermans | |
| 6,543,483 B2 | 4/2003 | Johnson | |
| 6,554,589 B2 | 4/2003 | Grapes | |
| 6,631,736 B2 | 10/2003 | Seitz et al. | |
| 6,644,353 B1 | 11/2003 | Eidsmore | |
| 6,976,664 B2 | 12/2005 | Welch et al. | |
| 7,104,275 B2 | 9/2006 | Dille | |
| 7,367,363 B2 | 5/2008 | Friedline et al. | |
| 7,383,853 B2 | 6/2008 | Welch et al. | |
| 8,235,067 B2 | 8/2012 | Gagne et al. | |
| 8,656,951 B2 | 2/2014 | Gagne et al. | |
| 9,447,888 B2 | 9/2016 | Gagne et al. | |
| 9,546,747 B2 | 1/2017 | Hofmann | |
| 2004/0163711 A1 | 8/2004 | Varone | |
| 2006/0048818 A1* | 3/2006 | Welch | F16L 55/10 137/269 |
| 2007/0278155 A1 | 12/2007 | Lo et al. | |
| 2007/0295867 A1* | 12/2007 | Hennon | F16L 3/1075 248/74.4 |
| 2008/0035227 A1 | 2/2008 | Woods et al. | |
| 2008/0237509 A1 | 10/2008 | Yamamoto | |
| 2009/0120503 A1 | 5/2009 | Donahue | |
| 2009/0188113 A1 | 7/2009 | McKeeth | |
| 2010/0288385 A1 | 11/2010 | Gagne et al. | |
| 2012/0017733 A1 | 1/2012 | Gay | |
| 2014/0224335 A1* | 8/2014 | Hofmann | B01J 19/0093 137/1 |

FOREIGN PATENT DOCUMENTS

| | | |
|---|---|---|
| GB | 1055426 | 1/1967 |
| JP | 2004293769 A | 10/2004 |
| WO | 97/11296 A | 3/1997 |
| WO | WO 2010132435 | 11/2010 |
| WO | WO 2015/109209 A2 | 7/2015 |

OTHER PUBLICATIONS

Response to First Office Action dated Aug. 15, 2019 in Chinese Application No. 2016800573087, including English translation of claims only (35 pages).
The extended European Search Report dated May 31, 2019 in European Application No. 16852791.9, (6 pages).
Communication pursuant to Rules 70(2) and 70a(2) EPC dated Jun. 18, 2019 in European Application No. 16852791.9, (1 page).
Invitation to Respond to Written Opinion dated May 30, 2019 in Singapore Application No. 11201802254R, (11 pages).
Invitation to Respond to Written Opinion dated Oct. 8, 2019 in Singapore Application No. 11201802254R, (18 pages).
PCT International Search Report for PCT/US2016/055016, Applicant: Alphinity, LLC, Form PCT/ISA/210 and 220, dated Feb. 9, 2017 (7pages).
PCT Written Opinion of the International Search Authority for PCT/US2016/055016, Applicant: Alphinity, LLC, Form PCT/ISA/237, dated Feb. 9, 2017 (7pages).
BioWorks LLC Product Brochure (date: unknown), BSC: Bio Sample Cup, Safe, Sanitary Material Storage, Easton, PA 18042, www.BioWorksLLC.com (6 pages).
Parker Mitos Product Brochure, Mitos Free Flow Valve, Apr. 29, 2009, http://www.mitostech.com/freelow.html (2 pages).
PCT International Search Report for PCT/US10/34371, Applicant: AlphaBio, Inc., Form PCT/ISA/210 and 220, dated Jul. 1, 2010 (4 pages).
PCT Written Opinion of the International Search Authority for PCT/US10/34371, Applicant: AlphaBio, Inc., Form PCT/ISA/237, dated Jul. 1, 2010 (7 pages).
PCT International Preliminary Report on Patentability (Chapter I of the Patent Cooperation Treaty) for PCT/US2010/034371, Applicant: AlphaBio, Inc., Form PCT/IB/326 and 373, dated Nov. 15, 2011 (9 pages).
BioWorks LLC Catalog, Model: BSV-H250-Bo, www.BioWorksLLC.com, cited in U.S. Appl. No. 14/165,206 dated Aug. 25, 2014 (6pages).
The extended European search report dated Nov. 29, 2016 in European Application No. 10775392.3-1751, Applicant: Alphinity, LLC, (10pages).
Notice of Preliminary Rejection dated Dec. 14, 2016 in Korean Patent Application No. 10-2011-7027072, (11pages).
Communication from European Patent Office dated Nov. 6, 2017 in European Patent Application No. 10775392.3-1751, (7pages).
PCT International Search Report for PCT/US2016/051714, Applicant: Alphinity, LLC, Form PCT/ISA/210 and 220, dated Dec. 7, 2016 (4pages).
PCT Written Opinion of the International Search Authority for PCT/US2016/051714, Applicant: Alphinity LLC, Form PCT/ISA/237, dated Dec. 7, 2016 (9pages).
PCT International Preliminary Report on Patentability (Chapter I of the Patent Cooperation Treaty) for PCT/US2016/055016, Applicant: Alphinity, LLC., Form PCT/IB/326 and 373, dated Apr. 12, 2018 (9pages).
Response to extended European search report dated Dec. 24, 2019 in European Patent Application No. 16852791.9, (4pages).
Notice of Allowance dated Jan. 23, 2020 in Singapore Patent Application No. 11201802254R, (5page).
Second Office Action dated Jan. 3, 2020 in Chinese Patent Application No. 2016800573087, (8pages).

* cited by examiner

VALVE ASSEMBLY WITH DIRECTIONAL FLOW PATH

RELATED APPLICATION

This Application is a U.S. National Stage filing under 35 U.S.C. § 371 of International Application No. PCT/US2016/055016, filed Sep. 30, 2016, which claims priority to U.S. Provisional Patent Application No. 62/236,007 filed on Oct. 1, 2015, which is hereby incorporated by reference. Priority is claimed pursuant to 35 U.S.C. §§ 119, 371 and any other applicable statute

FIELD OF THE INVENTION

The field of the invention generally relates to valve systems used in connection with pharmaceutical or bioprocess applications. More specifically, the field of the invention relates to valve systems that incorporate flexible, sterile conduits or tubing that may be used in pharmaceutical or bioprocess applications. The valve assembly described herein has particular suitability for use with chromatography, filtering, or trapping applications that utilize flow reversal.

BACKGROUND

Many commercial products are produced using chemical as well as biological processes. Pharmaceuticals, for example, are produced in commercial quantities using scaled-up reactors and other equipment. So-called biologics are drugs or other compounds that are produced or isolated from living entities such as cells or tissue. Biologics can be composed of proteins, nucleic acids, or complex combinations of these substances. They may even include living entities such as cells. In order to produce biologics on a commercial scale, sophisticated and expensive equipment is needed. In both pharmaceutical and biologics, for example, various processes need to occur before the final product is obtained. For example, in the case of biologics, cells may be grown in a growth chamber or the like and nutrients may need to be carefully modulated into the growth chamber. Waste products produced by cells may also have to be removed on a controlled basis from the fermentation chamber. As another example, biologic products produced by living cells or other organisms may need to be extracted and concentrated. This process may involve a variety of filtration and separation techniques.

Because there are a number of individual processes required to be produce the final product, various reactants, solutions, and washes are often pumped or otherwise transported to various subsystems using conduits and associated valves. These systems may be quite cumbersome and organizationally complex due to the large numbers of conduits, valves, sensors, and the like that may be needed in such systems. Not only are these systems visually complex (e.g., resembling spaghetti) they also include many components that are required to be sterilized between uses to avoid cross-contamination issues. Indeed, the case of drug and biologic preparation, the Federal Food and Drug Administration (FDA) is becoming increasingly strict on cleaning, sterilization or bio-burden reduction procedures that are required for drug and pharmaceutical preparations. This is particularly a concern because many of these products are produced in batches which would require repeated cleaning, sterilization or bio-burden reduction activities on a variety of components.

More recently, disposable solutions have been proposed that utilize flexible (e.g., silicone) tubing during the manufacturing process. The flexible tubing may be discarded after use and replaced with new tubing, thereby avoiding the need to sterilize some or all of the equipment. For valve operations, the flexible tubing is placed inside a two-piece valve and a valve actuator is used to selectively pinch the flexible tubing. The valve is closed when the flexible tubing is pinched shut by the valve actuator and open when the actuator leaves the flexible tubing in the resting, open state. Often these valves need to interface with or connect to other process operations. In many pharmaceutical or bioprocess applications, particular process operations may require that fluid flow be reversed. In such situations, like when a chromatography column is used, this may require a large number of separate valves and conduits to accomplish the desired flow reversal. There thus is a need for a more elegant and compact solution to reverse flow that also incorporates the benefits of using flexible, disposable tubing.

SUMMARY

In one embodiment, a valve assembly with a multidirectional flow path includes a valve body that includes respective hinged portions defining respective passageways extending through the valve body when in a closed state. A flexible conduit or tubing having a loop portion and a plurality of branches extending from the loop portion is at least partially positioned within the valve body. In some embodiments, the loop portion is entirely contained within the valve body. For embodiments in which the loop extends beyond the valve body, these portions are encapsulated by respective rigid jackets. Multiple valves are situated on the valve body and are used to selectively pinch the loop portion in different pinching configurations to direct fluid to or from the particular branches. The valve assembly may be integrated into a manufacturing or other production process with optional additional jackets used to encapsulate the flexible conduit branches.

In another embodiment, a valve assembly with a multi-directional flow path includes a valve body having a first body portion (e.g., half) and a second body portion (e.g., half) connected to one another at one or more hinges, the first body portion and the second body portion defining respective passageways extending through the valve body when in a closed state. A flexible conduit is disposed in the passageways of the valve body. The flexible conduit has a loop or loop portion connected to a first branch, a second branch, a third branch, and a fourth branch, wherein the second and fourth branches are fluidically connected to one another across the loop portion via a connector segment (used as bypass). A first valve is disposed on the valve body and has an actuator configured to actuate a pinching element to pinch the flexible conduit loop between the first branch and the second branch. A second valve is disposed on the valve body and has an actuator configured to actuate a pinching element to pinch the flexible conduit loop between the second branch and the third branch. A third valve is disposed on the valve body and has an actuator configured to actuate a pinching element to pinch the flexible conduit loop between the third branch and the fourth branch. A fourth valve is disposed on the valve body and has an actuator configured to actuate a pinching element to pinch the flexible conduit loop between the fourth branch and the first branch. A fifth valve is disposed on the valve body and has an actuator configured to actuate a pinching element to pinch the flexible conduit in the connector segment (e.g., the bypass segment). In this embodiment, a first portion of the loop extends outside the valve body and is contained in a first rigid jacket and a second portion of the loop extends outside the valve body and is contained in a second rigid jacket. The valve assembly may include at least one fastener thereon to secure the valve body in a closed state.

In another embodiment, a valve assembly with a multidirectional flow path includes a valve body having a first body portion (e.g., half) and a second body portion (e.g., half) connected to one another at one or more hinges, the first body portion and the second body portion defining respective passageways extending through the valve body when in a closed state. A flexible conduit is disposed in the passageways of the valve body. The flexible conduit has a loop or loop portion that is contained within the valve body and connected to a first branch, a second branch, a third branch, and a fourth branch, wherein the second and fourth branches are fluidically connected to one another across the loop portion via a connector segment. A first valve is disposed on the valve body and has an actuator configured to actuate a pinching element to pinch the flexible conduit loop between the first branch and the second branch. A second valve is disposed on the valve body and has an actuator configured to actuate a pinching element to pinch the flexible conduit loop between the first branch and the second branch. A third valve is disposed on the valve body and has an actuator configured to actuate a pinching element to pinch the flexible conduit loop between the second branch and the third branch. A fourth valve is disposed on the valve body and has an actuator configured to actuate a pinching element to pinch the flexible conduit loop between the second branch and the third branch. A fifth valve is disposed on the valve body and has an actuator configured to actuate a pinching element to pinch the flexible conduit loop between the third branch and the fourth branch. A sixth valve is disposed on the valve body and has an actuator configured to actuate a pinching element to pinch the flexible conduit loop between the third branch and the fourth branch. A seventh valve is disposed on the valve body and has an actuator configured to actuate a pinching element to pinch the flexible conduit loop between the fourth branch and the first branch. An eighth valve is disposed on the valve body and has an actuator configured to actuate a pinching element to pinch the flexible conduit loop between the fourth branch and the first branch. A ninth valve is disposed on the valve body and has an actuator configured to actuate a pinching element to pinch the flexible conduit in the connector segment (e.g., bypass segment). The valve assembly includes least one fastener configured to secure the valve body in a closed state.

In another embodiment, a flexible conduit or tubing for use in a multidirectional flow path includes a loop having a first branch, a second branch, a third branch, and a fourth branch, wherein the second and fourth branches are fluidically connected to one another across the loop portion via a connector segment, wherein the loop is formed in three (3) pieces connected at four (4) interface locations. The interface locations may be formed by overmolding a connector such as a bubble connector at the interface locations. In one embodiment, the three (3) pieces include a central double cross piece bonded to two TEE pieces at four (4) interface locations.

In another embodiment, a method of making a flexible conduit having a loop portion includes the steps or operations of providing a double cross shaped section of tubing; providing a first TEE section of tubing and a second TEE section of tubing; securing one end of the first TEE section to the double cross shaped section of tubing via a first overmolded connector; securing one end of the second TEE section to the double cross shaped section of tubing via a second overmolded connector; securing a second end of the first TEE section to the double cross shaped section of tubing via a third overmolded connector; and securing a second end of the second TEE section to the double cross shaped section of tubing via a fourth overmolded connector.

DETAILED DESCRIPTION OF THE ILLUSTRATED EMBODIMENTS

Figure 1:
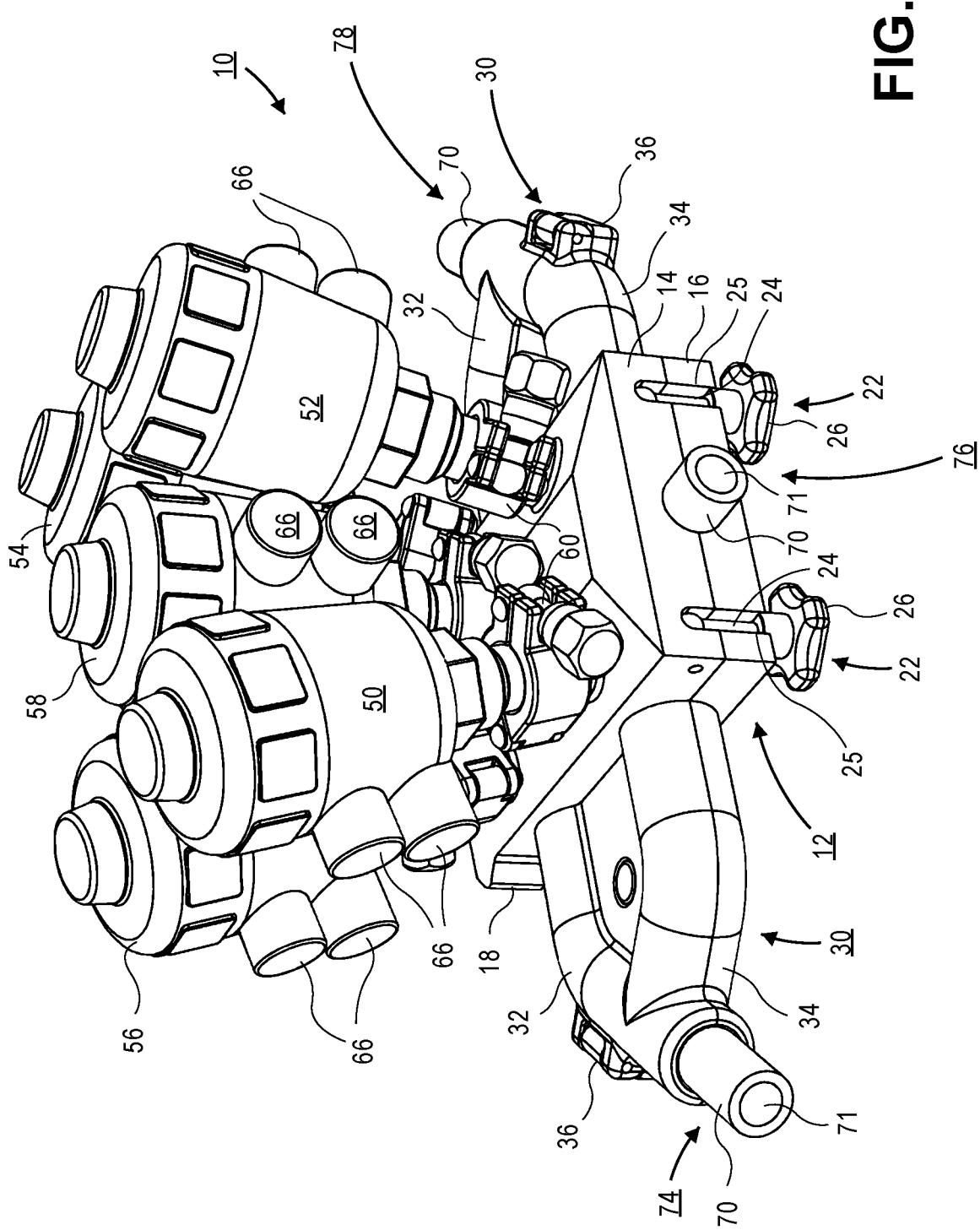
FIG. 1 illustrates a perspective view of the valve assembly according to one embodiment.
Figure 2:
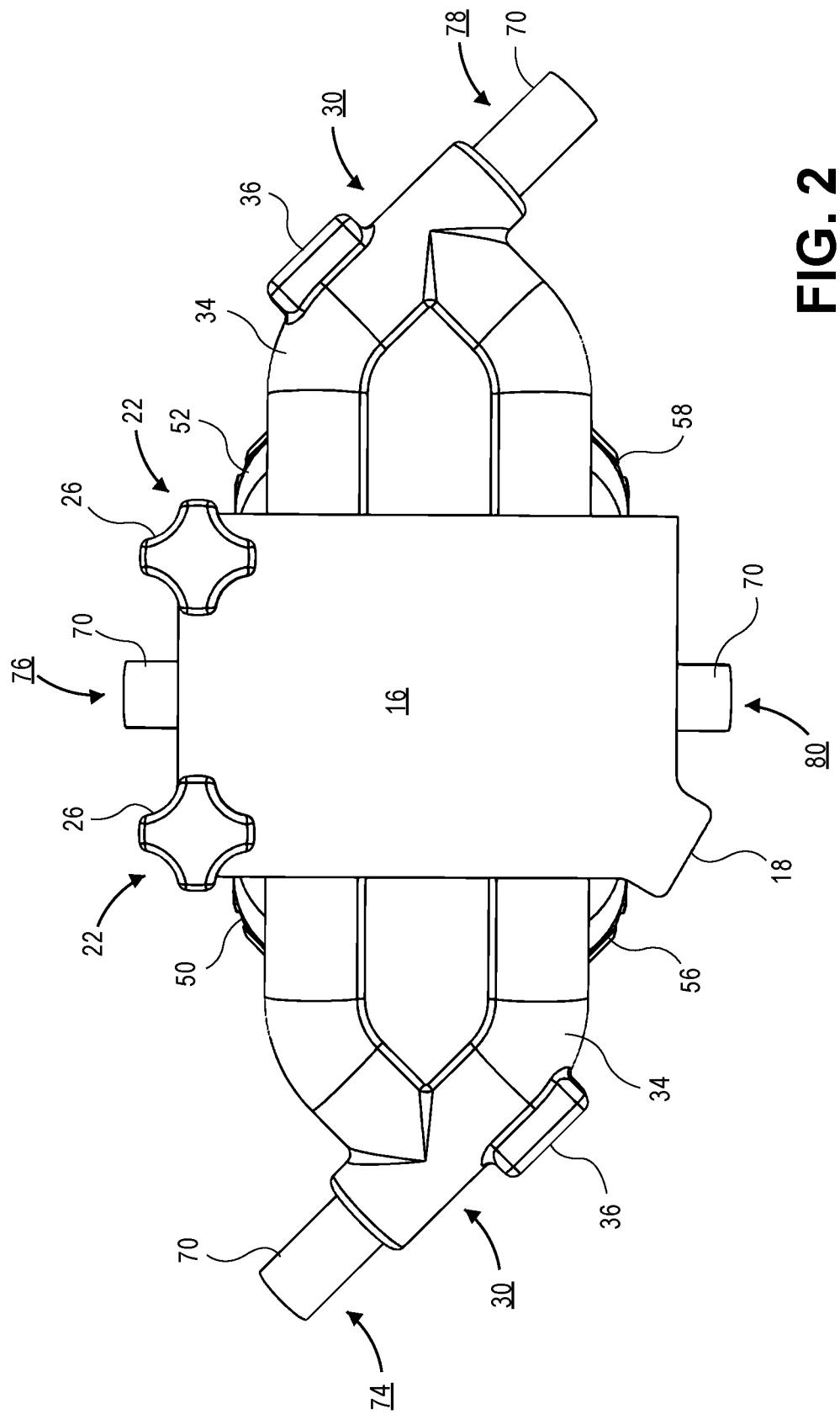
FIG. 2 illustrates a bottom view of the valve assembly of FIG. 1.
Figure 3:
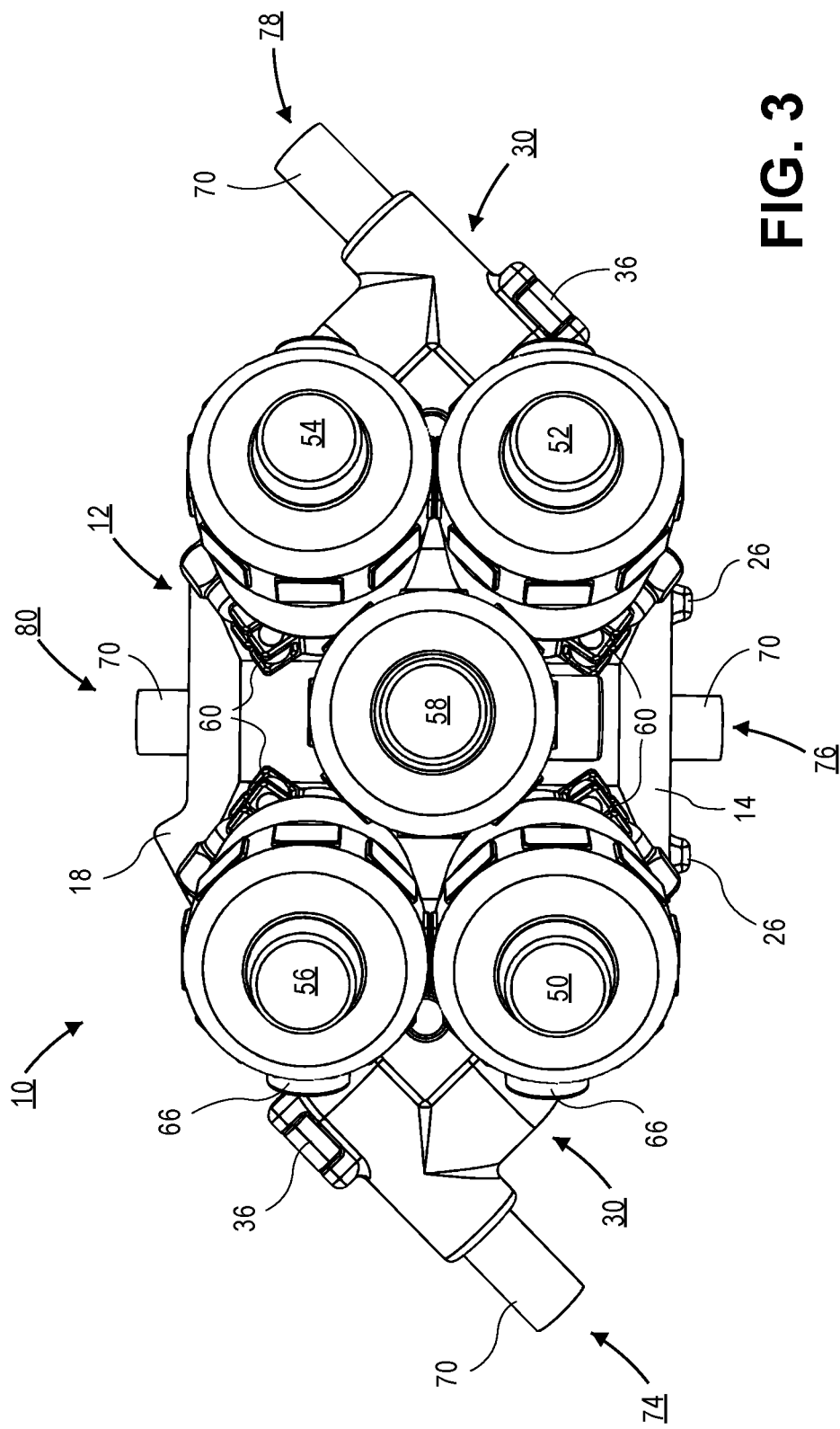
FIG. 3 illustrates a top view of the valve assembly of FIG. 1.

FIGS. 1-10 illustrate one embodiment of a valve assembly 10 that is used to create a multidirectional flow path according to one embodiment. The valve assembly 10 includes a valve body 12 that includes a first body portion 14 and second body portion 16 that are connected to one another via one or more hinges 18 (seen in FIGS. 2, 3, 4, 5, 6). The valve body 12 and the respective portions 14, 16 are typically made from a metallic material (e.g., stainless steel) but it could also be formed from a suitably hard plastic material. The first and second body portions 14, 16 when in a closed state, define passageways 20 (best seen in FIGS. 5 and 6) that extend through the closed valve body 12 that receives the flexible conduit 70. In one embodiment the passageways 20 are substantially circular in cross section when the valve body 12 is in the closed state. For example, the first body portion 14 may include a semi-annular or semi-circular passageway formed in a surface thereof that mates with a corresponding semi-annular or semi-circular passageway formed in a surface of the second body portion 16 to create the annular or circular passageway 20. While a circular shaped passageway 20 is preferred other shapes could also be utilized. The particular layout of the passageways 20 are formed to accommodate a flexible tubing or conduit 70 that is placed therein. The size and shape of the passageways 20 are such that the flexible conduit 70 fits snuggly therein. For example, the inner diameter of the passageways 20 may closely match the outer diameter of the flexible conduit 20. The flexible tubing or conduit 70, as disclosed below in more detail below, includes a loop portion 72 that is utilized to create a multidirectional flow path when used in combination with a series of valves as described herein. The flexible conduit 70 includes an internal lumen 71 (seen in FIG. 1) through which fluid travels.

The first and second body portions 14, 16 may be secured in the closed state using one or more fasteners 22. The fasteners 22 may include a pivoting latch 24 that has threads on which a knob 26 rotates that can be tightened and/or loosened to selectively close/open the valve body 12. The pivoting latch 24 may be rotated into a notch 25 or the like (see FIGS. 1 and 5) located on the first and second body portions 14, 16 and the knob 26 is tightened to maintain the valve body 12 in the closed state. Conversely, the knob 26 can be loosened and the pivoting latch 24 rotated out from the notch 25 to enable the valve body 12 to be opened via the one or more hinges 18.

Referring to FIGS. 1-4 and 7A and 7F, the flexible conduit 70 used in this embodiment includes a loop portion 72 that defines a circular fluid pathway. Fluidly connected to the loop portion 72, in this embodiment, are a first branch 74, a second branch 76, a third branch 78, and fourth branch 80. The flexible conduit 70 includes a connector segment 82 that fluidically connects opposing sides of the loop portion 72. The connector segment 82 is used to form a bypass pathway between branches 76, 78. This connector segment 82 may be located between the second branch 76 and the fourth branch 80 but it also may connect indirectly with branches 76, 80 via the loop. The key requirement is that the connector segment 82 be located in the loop portion 72 that is inside the closure points described below.

The flexible conduit 70 is used to carry a fluid through the valve assembly 10. In the illustrated embodiment, the flexible conduit 70 carries a pressurized fluid, for example, a fluid at pressures above 50 psig. The flexible conduit 70 may include silicone (e.g., platinum cured silicone) however other materials may be used. These include, for example, a polymer such as thermoplastic elastomers (TPE), thermoplastic rubber (TPR), or the like. The flexible conduit 70 may be unreinforced as illustrated or in some embodiments it may be reinforced. The embodiment described herein has particular applicability for unreinforced flexible conduit 70. The flexible conduit 70 may have a variety of sizes. For example, without limiting the invention, the flexible conduit 70 may have an internal diameter of 0.5 inches and an outer diameter of 0.75 inches. Of course, this is only illustrative and other diameters may also be used.

Figure 7A:
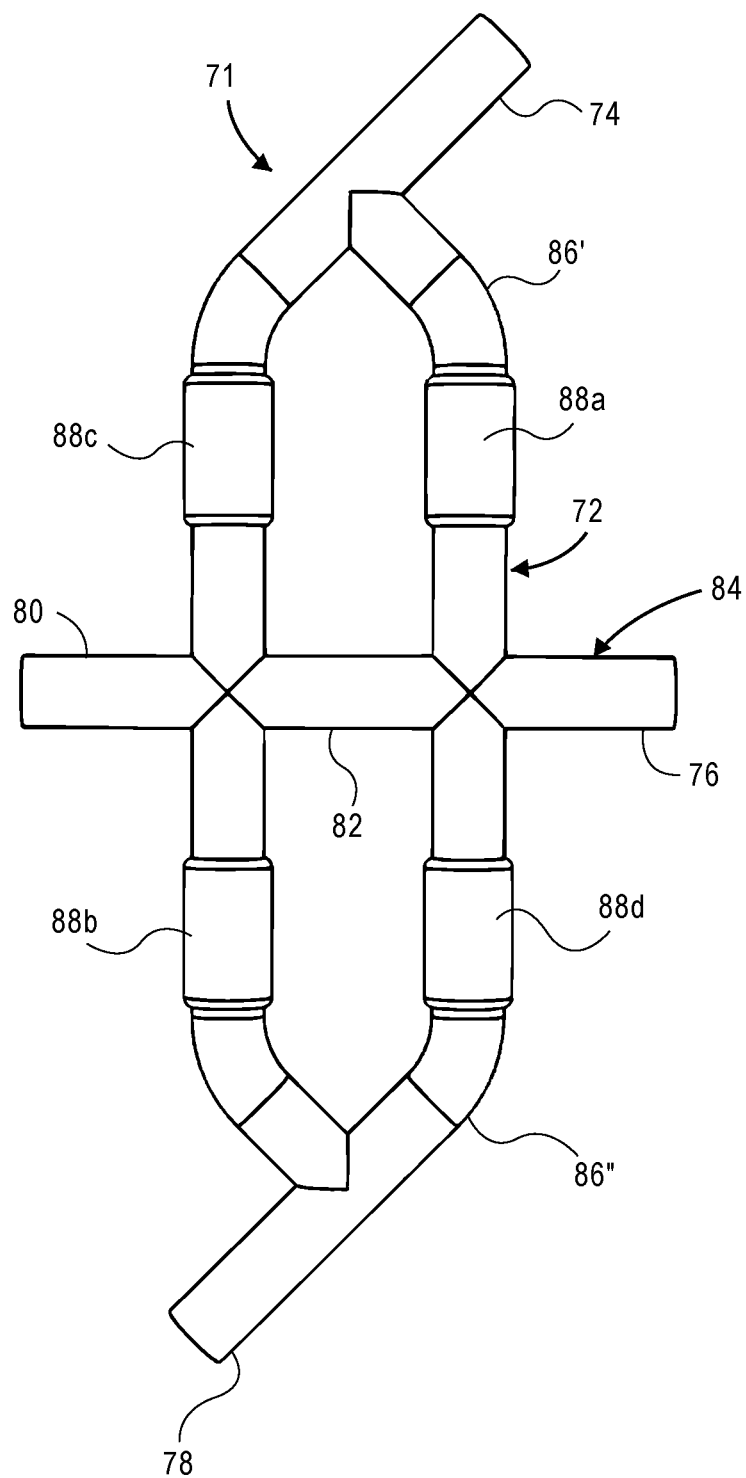
FIG. 7A illustrates a flexible conduit according to one embodiment.
Figure 11:
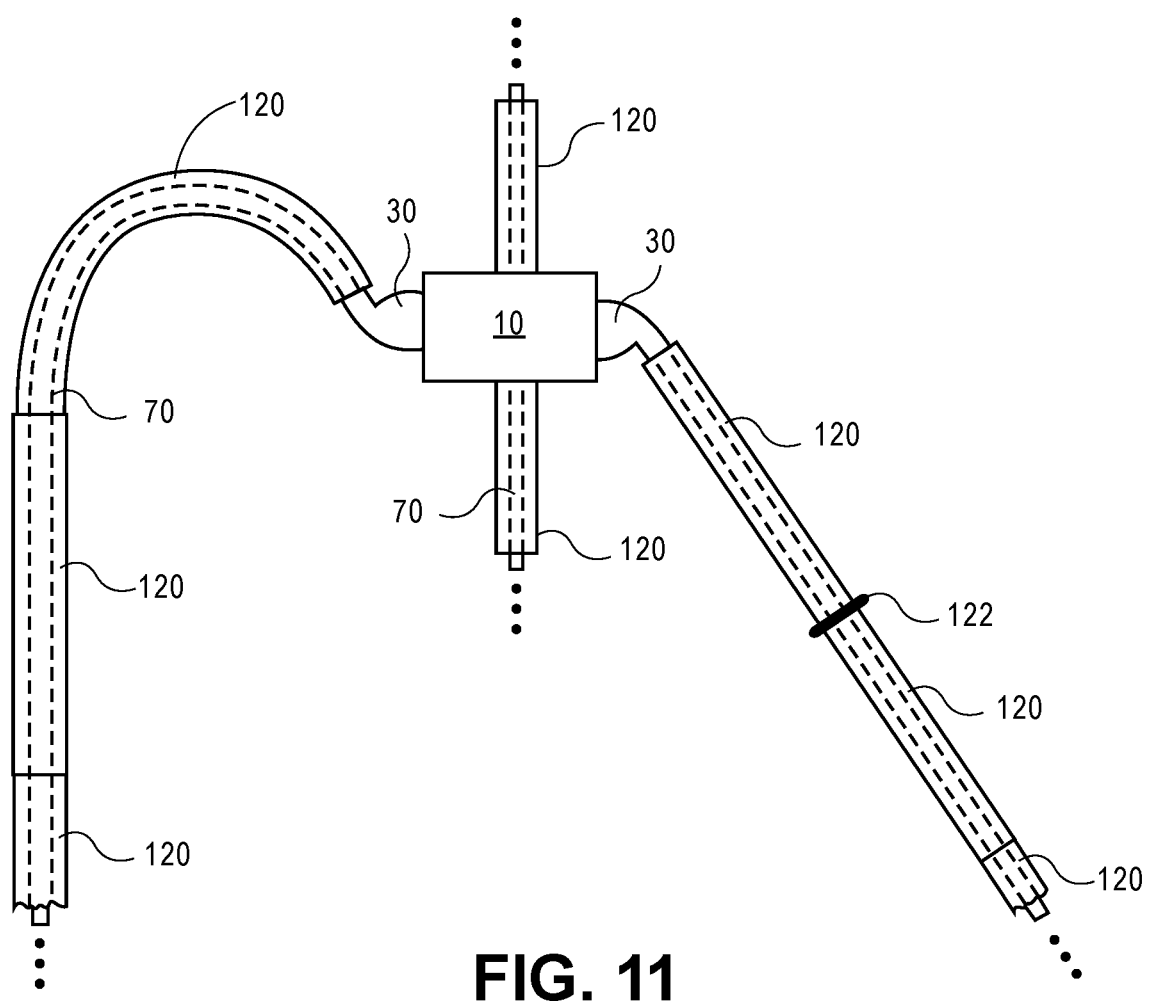
FIG. 11 illustrates the valve assembly used in an exemplary high pressure application that uses a number of jackets to encapsulate the flexible conduit.

In FIG. 7A, the ends of the first branch 74, second branch 76, third branch 78, and fourth branch 80 are illustrated as relatively short segments but it should be understood that these branches 74, 76, 78, and 80 may be longer (or shorter). In addition, the ends of the branches 74, 76, 78, and 80 may terminate in a flange or the like such that another segment (not illustrated) may be coupled to the end of the branch 74, 76, 78, and 80 using a connector or the like. The first branch 74, second branch 76, third branch 78, and fourth branch 80 may extend some distance beyond the valve assembly 10 and may be encapsulated or enclosed in one or more jackets 120 as illustrated in FIG. 11. The jackets 120 may include two-piece jackets that are attached to one another via hinges or the like. The jackets 120 may be closed around the flexible conduit or tubing 70 and secured in the closed state using one or more fasteners like those disclosed herein to prevent the flexible conduit 70 from expanding and failing under high fluidic pressures. The jackets 120 may also be used to direct the flexible conduit or tubing 70 to adjacent components or operations that are part of the manufacturing process. The jackets 120 provide the ability to direct the flexible conduit or tubing 70 in three-dimensional space to orderly arrange and manage the manufacturing or production process that employs flexible conduit or tubing 70.

With reference to FIGS. 7A-7F, in one embodiment, the loop portion 72 of the flexible conduit 70 may be formed by joining multiple different segments of flexible conduit 70 to form the final structure illustrated in FIG. 7A. In this example, three different pieces or sections of flexible conduit 70 are bonded or otherwise secured to one another in a molding process to form the completed loop portion 72. For example, in one embodiment, a double cross segment 84 may be bonded to two "Y" or TEE segments 86', 86" using over-molded bubble connectors 88a, 88b, 88c, 88d that connect the respective ends of the TEE segments 86', 86" to the double cross segment 84 that is formed during the process of forming the flexible conduit 70. In this embodiment, there are four (4) interface locations (i.e., bubble connectors 88a, 88b, 88c, 88d) that are formed where the two Y or TEE segments 86', 86" are secured to the ends of the cross segment 84. Note that in other embodiments, the loop or loop portion 72 may have additional branches formed beyond the four branches 74, 76, 78, 80 that are illustrated.

Figure 7B:
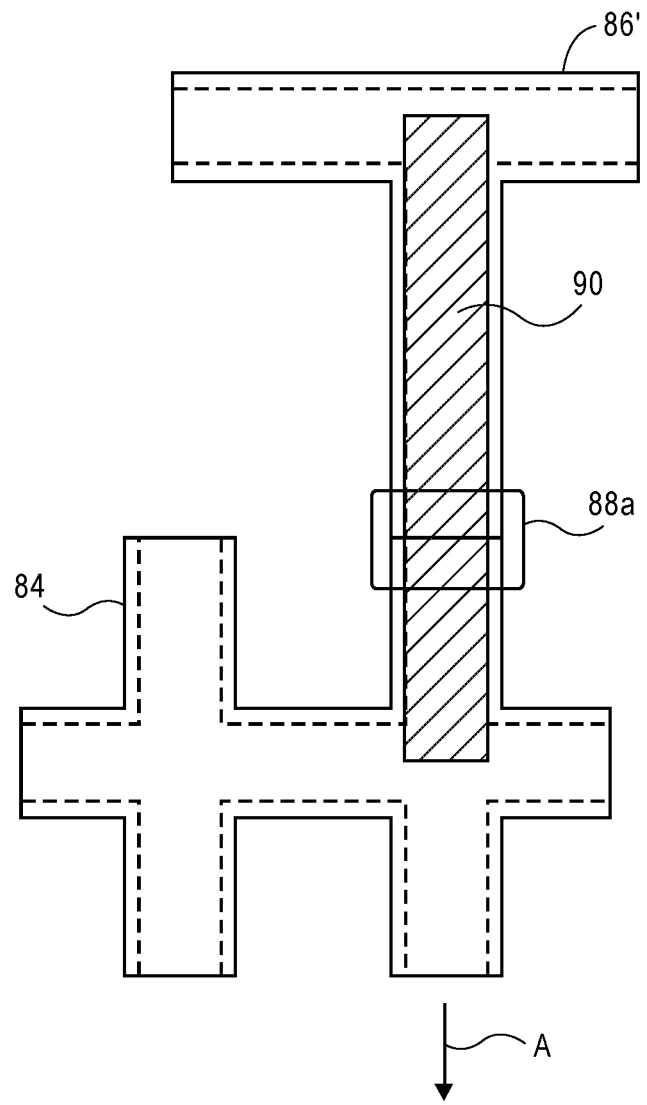
FIGS. 7B-7F illustrate one method of making a flexible conduit having a loop portion therein.
Figure 7C:
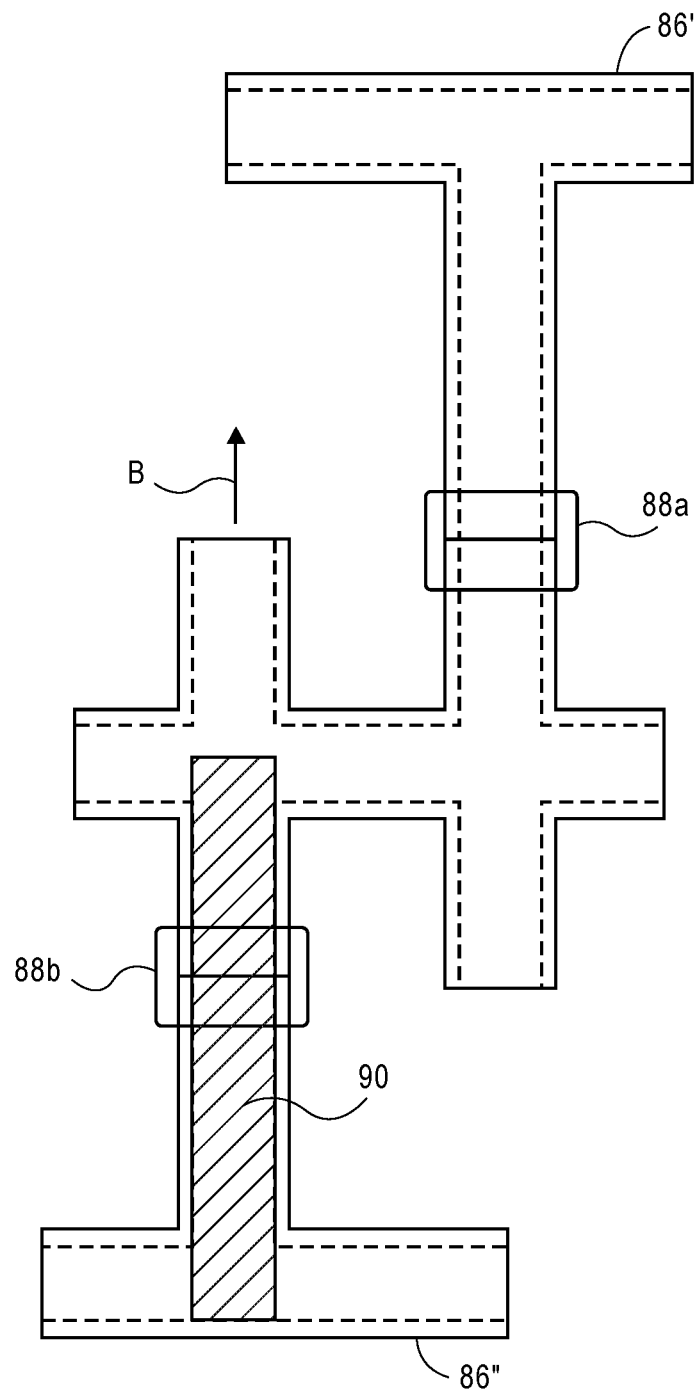

To form the flexible conduit 70 with the loop portion 72, a first Y or TEE segment 86' is secured to the double cross segment 84 as illustrated in FIG. 7B. A mandrel 90 which may be a metallic shaft or the like having an outer diameter around the same as the inner diameter of the flexible tubing forming the double cross segment 84 and the Y or TEE segment 86' is inserted as illustrated. The joined structure is then placed into a mold (not shown) that includes a cavity that defines the bubble connector 88a. A polymer material such as silicone is then injected into the mold and cured (e.g., platinum cured) to form the bubble connector 88a at the interface between the first Y or TEE segment 86' and the double cross segment 84. The mandrel 90 can then be removed by pulling the mandrel 90 out of the now-formed structure in the direction of arrow A in FIG. 7B. Next, with reference to FIG. 7C, a second Y or TEE segment 86" is secured to the double cross segment 84. The mandrel 90 in inserted into the second Y or TEE segment 86" and the double cross segment 84. The joined structure is then placed into the mold as described previously where a bubble connector 88b is formed around the joint between the second Y or TEE segment 86" and the double cross segment 84 as illustrated in FIG. 7C. After curing, the mandrel 90 is removed by pulling the same in the direction of arrow B.

Figure 7D:
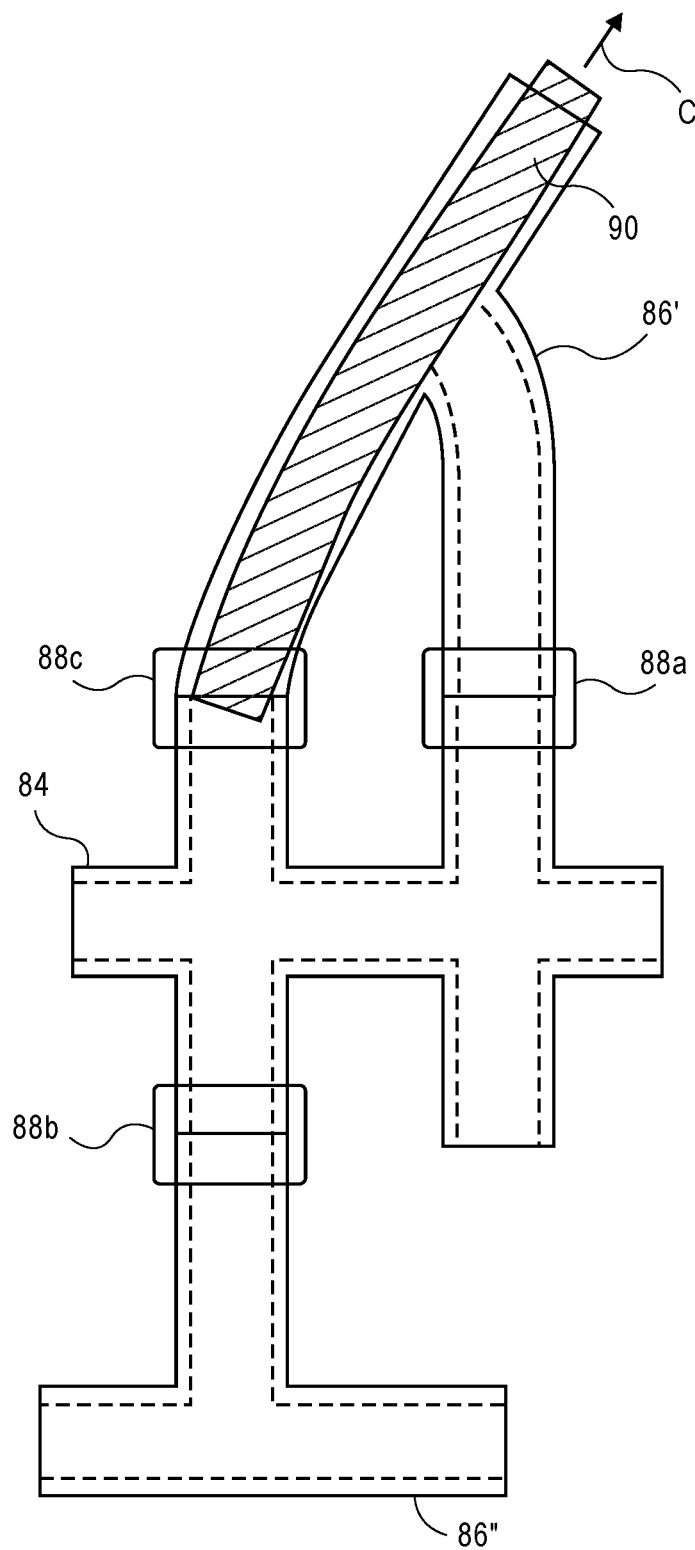
Figure 7E:
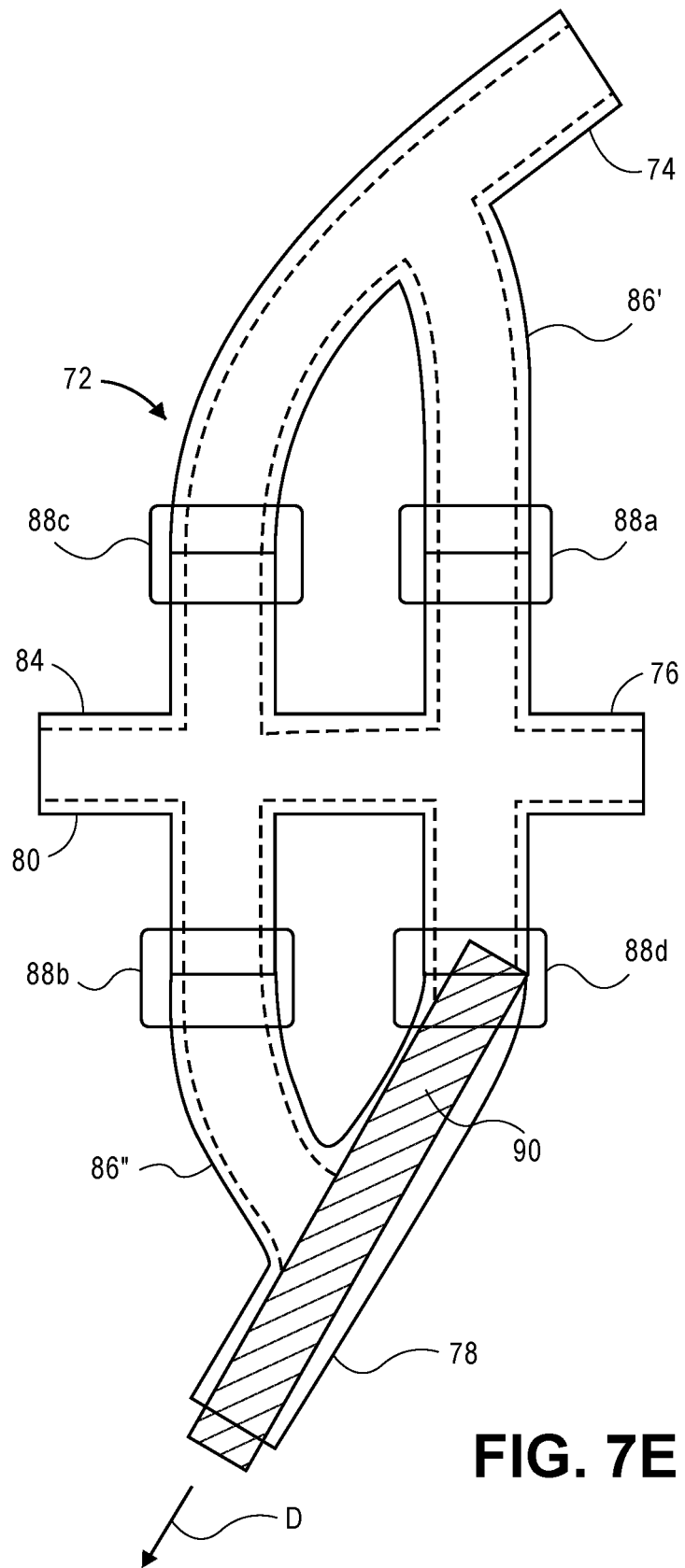

Next, with reference to FIG. 7D, the mandrel 90 is positioned within a segment or leg of the first Y or TEE segment 86' and the double cross segment 84 as illustrated. The joined structure is then placed into the mold as described previously where a bubble connector 88c is formed around the joint between the second Y or TEE segment 86" and the double cross segment 84 as illustrated in FIG. 7C. After curing, the mandrel 90 is removed by pulling the same in the direction of arrow C. With reference to FIG. 7E, the mandrel 90 is then positioned in the remaining segment or leg of the second Y or TEE segment 86" and the double cross segment 84 as illustrated. The joined structure is then placed into the mold as described previously where a bubble connector 88*d* is formed around the joint between the second Y or TEE segment 86" and the double cross segment 84. After curing, the mandrel 90 is removed by pulling the same in the direction of arrow D. Note that, alternatively, the segment or leg of the second Y or TEE segment 86" could be joined to the double cross segment 84 prior to joining the segment or leg of the first Y or TEE segment 86' to the double cross segment 84.

Figure 7F:
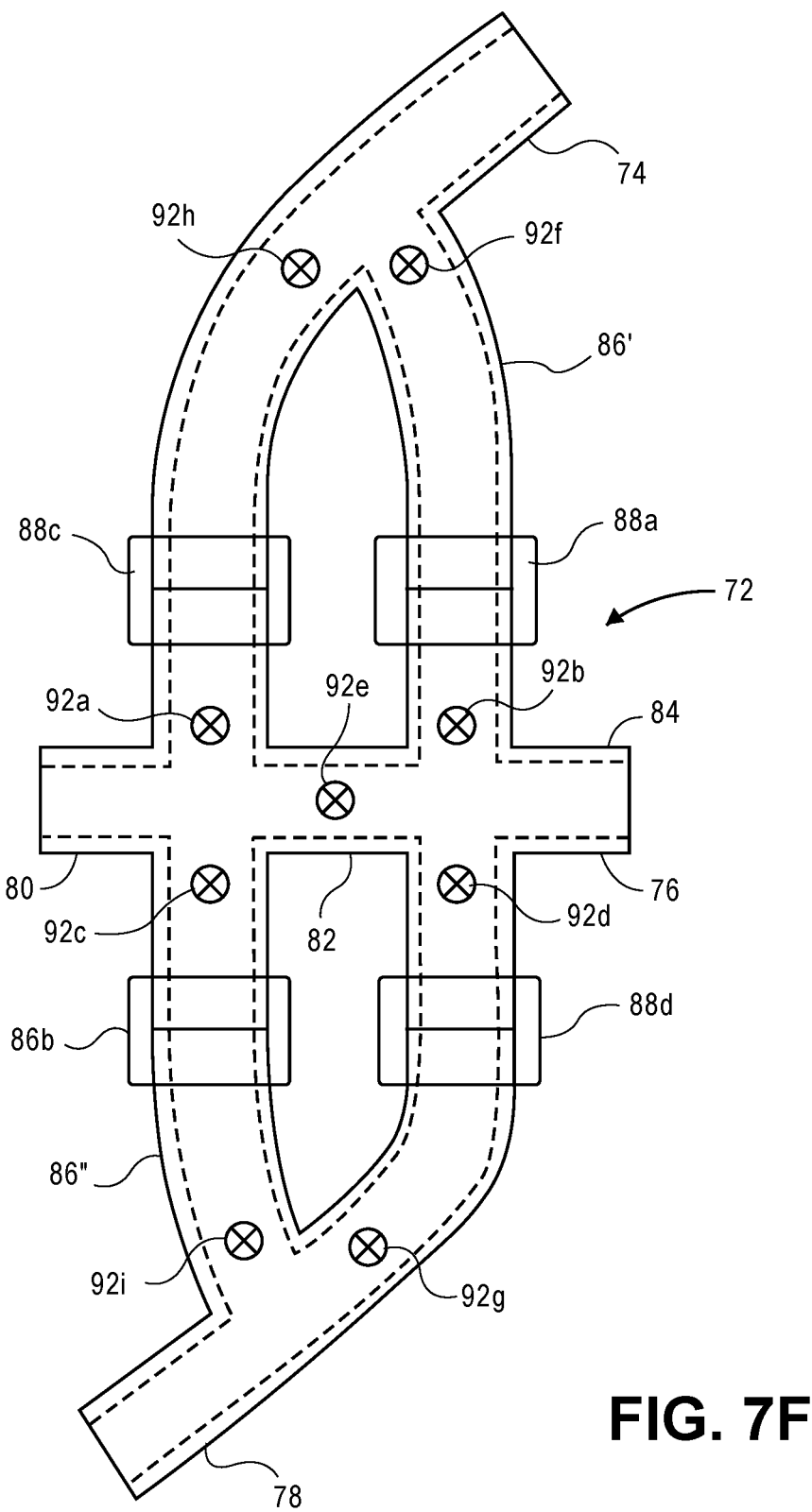

FIG. 7F illustrates a view of the completed flexible conduit 70 with the loop portion 72. Note that there are four branches 74, 76, 78, 80 or ends that extend from the loop portion 72. These branches 74, 76, 78, 80 may have a variety of lengths. In addition, the branches 74, 76, 78, 80 of the flexible conduit 70 may have one or more optional ends or connectors (not shown) added. These may be added via another molding operation. These may include extensions of clear tubing, braided hose, hose barb, or molded tri-clamp gaskets.

A significant benefit of making the flexible conduit 70 with the loop portion 72 in this manner is that valve closure points 92*a*, 92*b*, 92*c*, 92*d*, 92*e*, 92*f*, 92*g*, 92*h*, 92*i* can be situated at locations that eliminate or significantly reduce any hold up volumes with the loop portion 72. Other manufacturing processes apply bulky or bulbous overmolding connectors between various intersection pathways. Valve closure points 92*a*, 92*b*, 92*c*, 92*d*, 92*e*, 92*f*, 92*g*, 92*h*, 92*i* cannot be located where these large overmolding features are located. In contrast, as seen in FIG. 7F, valve closure points 92*a*, 92*b*, 92*c*, 92*d*, 92*e*, 92*f*, 92*g*, 92*h*, 92*i* can be located very close to intersecting fluid pathways. Importantly, these valve closure points 92*a*, 92*b*, 92*c*, 92*d*, 92*e*, 92*f*, 92*g*, 92*h*, 92*i* are all located at positions where there is native flexible conduit 70 that is not overlaid or obstructed with any overmolding or other bulky joint material.

Preferably the closure points 92*a*, 92*b*, 92*c*, 92*d*, 92*e*, 92*f*, 92*g*, 92*h*, 92*i* are within less than 1 cm from an intersecting or adjacent flow path or fluid pathway. Even more preferably the closure points 92*a*, 92*b*, 92*c*, 92*d*, 92*e*, 92*f*, 92*g*, 92*h*, 92*i* are located as close as possible to an intersecting or adjacent flow path or fluid pathway without intruding into or adversely affecting the other flow path or fluid pathway. For example, as seen in FIG. 7F, there are four (4) valve closure points 92*a*, 92*b*, 92*c*, 92*d* that are created right adjacent to the intersecting flow paths of the double cross segment 84. Closure of these valve closure points 92*a*, 92*b*, 92*c*, 92*d* prevents the holdup of valuable reagents or products in the legs or segments of the double cross segment 84 or the first or second Y or TEE segments 86', 86". For example, for the valve assembly 10 with five (5) valves illustrated in FIGS. 1-6, the valves are positioned to create closure points 92*a*, 92*b*, 92*c*, 92*d*, 92*e* that are closely located near the bypass pathway formed between branches 76, 80 and connector segment 82.

There may also be additional valve closure points 92*f*, 92*g*, 92*h*, 92*i* as illustrated in FIG. 7F. For example, in FIG. 7F, there are four (4) additional valve closure points 92*f*, 92*g*, 92*h*, 92*i* located near the legs or segments of the Y or TEE segments 86', 86". These valve closure points 92*f*, 92*g*, 92*h*, 92*i* prevent the holdup of fluid from branches 74, 78. These additional closure points 92*f*, 92*g*, 92*h*, 92*i* are used, for example, in the valve assembly of FIGS. 12A and 12B where nine (9) valves are used. The feature of being able to minimize or even eliminate holdup volume with the loop portion 72 is particularly important for pharmaceutical and biopharmaceutical applications where even small quantities of a drug or product can represent significant dollar amounts. Moreover, the holdup volume areas can contain residual fluid and/or reagents that can contaminate or adversely affect other processes taking place in the manufacturing operation. These may, for example, affect the yield of a product.

Referring to FIGS. 1-4 and 8, the valve assembly 10, in one embodiment, includes rigid jackets 30 that encapsulate portions of the flexible conduit 70. In particular, the rigid jackets 30 encapsulate the parts of the loop portion 72 that extend outside of the valve body 12. Each jacket 30 includes a first half 32 and a second half 34 that are connected to one another via one or more hinges 36. Like the valve body 12, when the first half 32 and the second half 34 of the jacket 30 is closed, a passageway 38 is formed inside the jackets 30 to carry portions of the flexible conduit 70. These passageways 38 are dimensioned to accommodate the flexible conduit 70 (e.g., circular shaped when fully closed). The first half 32 and the second half 34 of each jacket 30 contains a semi-annular or semi-circular recess that when brought together in the closed state forms a circular or annular passageway 38 that accommodates the flexible conduit 70. The dimensions of the passageway 38 is such that the flexible conduit 70 is snuggly held therein much like the valve body 12.

In one aspect, the jackets 30 are formed from a hard, polymer based material. For example, these include polymer materials such as acrylonitrile butadiene styrene (ABS) or other engineered thermoplastic materials suitable for the environment or application. Examples include standard thermoplastics and polyolefins such as polyethylene (PE) and polypropylene (PP), polyetherimide (PEI) (e.g., ULTEM resins), aliphatic polyamides (e.g., Nylon), polyphenylsulfone (e.g., RADEL), fluoropolymers such as polyvinylidene fluoride (PVDF) or perfluoroalkoxy (PFA), polytetrafluoroethylene (PTFE), polycarbonate (which may be more thermally resistant), polysulfone (PSU). Of course, the jackets 30 may also be made from a metal material (e.g., stainless steel).

Figure 5:
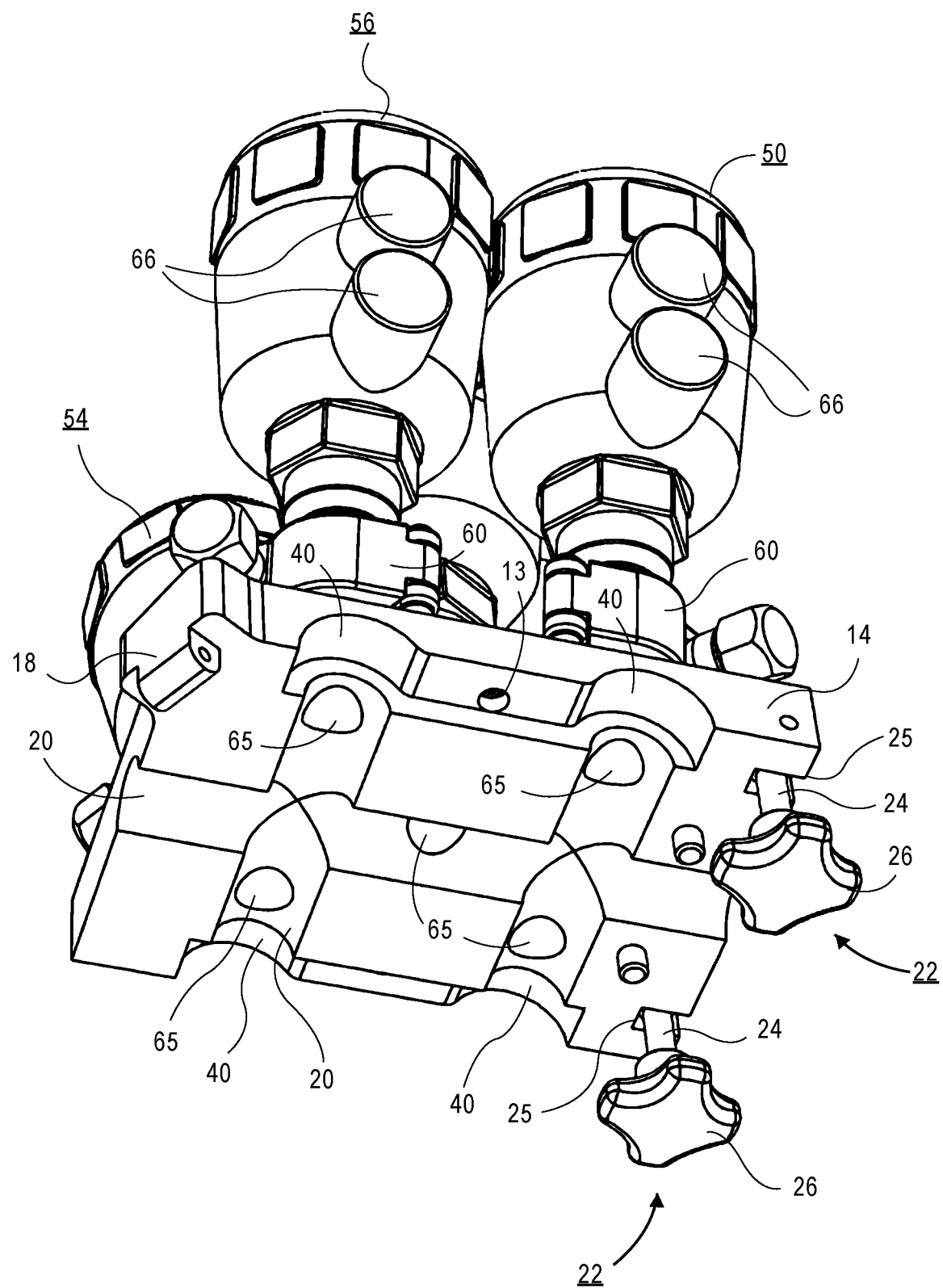
FIG. 5 illustrates a perspective view of the valve assembly of FIG. 1 with one half of the valve body removed (as well as flexible conduit removed).
Figure 6:
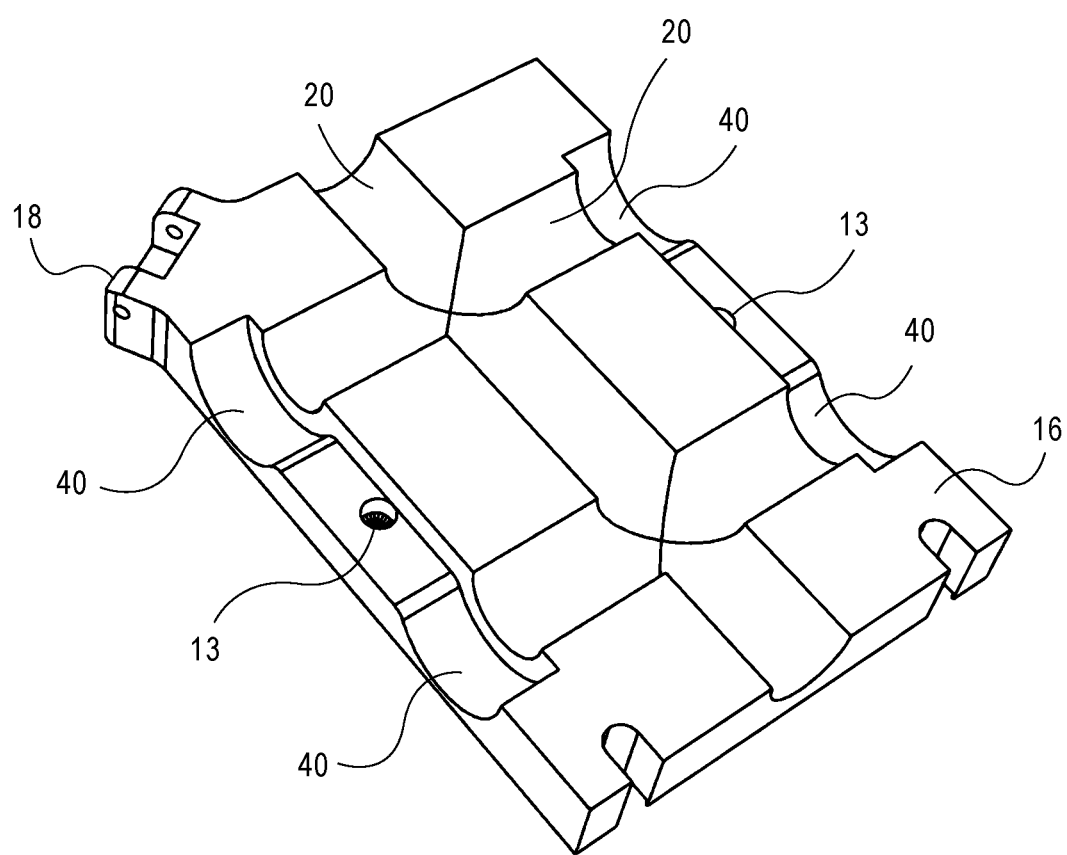
FIG. 6 illustrates a perspective of the other half removed from FIG. 5.
Figure 8:
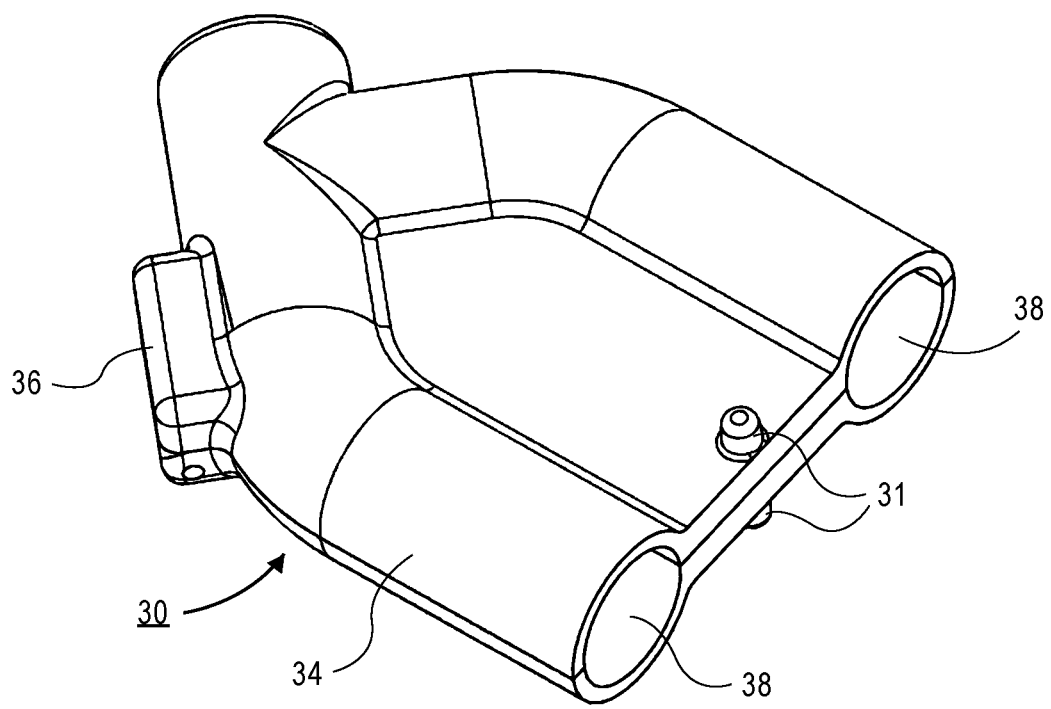
FIG. 8 illustrates a rigid jacket according to one embodiment.
Figure 9:
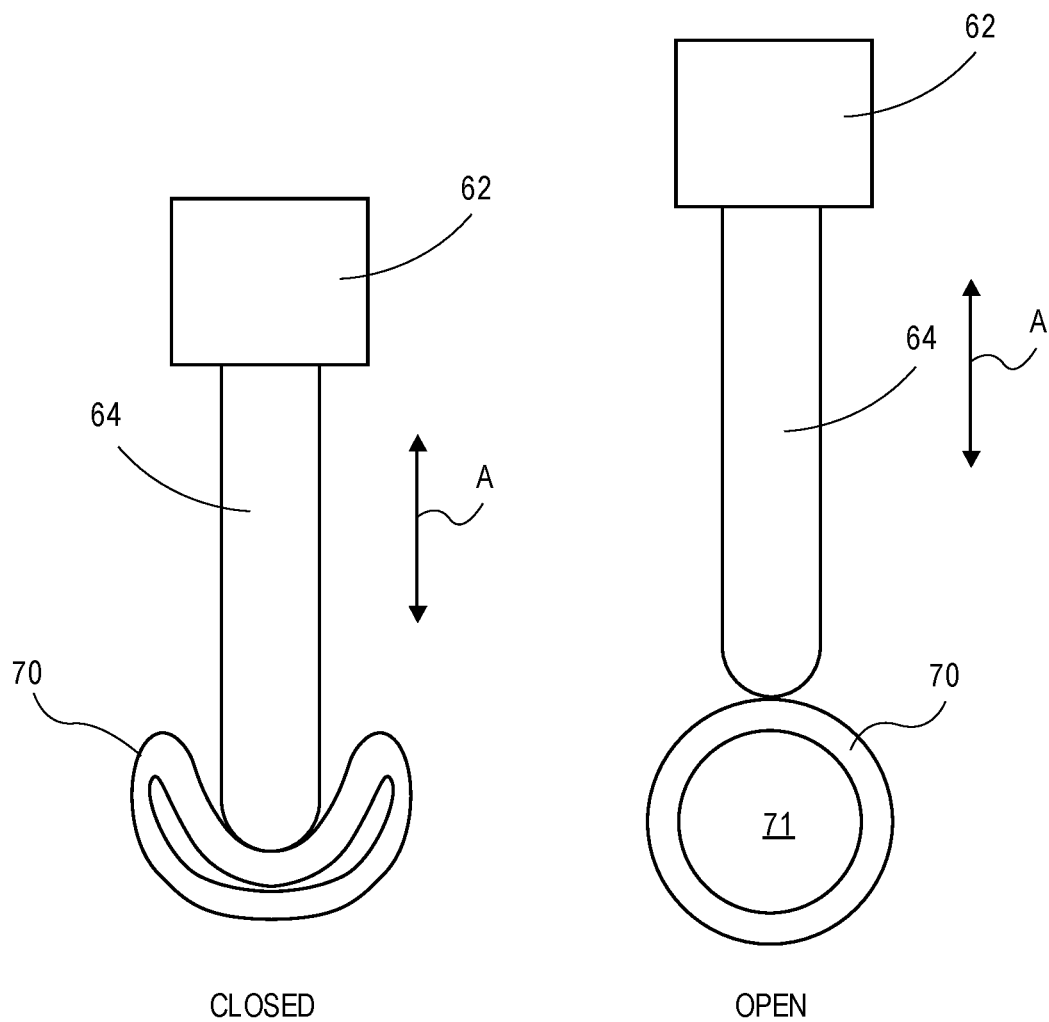
FIG. 9 illustrates how the actuator and pinching element toggles between closed and open states in response to movement of the pinching element.

In one embodiment, the jackets 30 are held or maintained in the closed state by the valve body 12. Specifically, as seen in FIGS. 5 and 6, the first and second valve body portions 14, 16 may include recesses 40 formed therein that receive end portions of the jackets 30 and thus close around the exterior portion of the jackets 30 when the valve body 12 is in the closed state. Alternatively, the jackets 30 may be held closed by one or more fasteners such as fasteners 22 described herein. The jackets 30 may also be held together using a friction fit/press fit or similar technique. In other embodiments, the ends to of the jacket 30 may include a flanged end or that like that are configured to interface with corresponding receiving portions on the valve body 12 (or vice versa). These may include a shoulder or groove that is formed in the recess 40 that is dimensioned to receive and accommodate the flanged end. The end of the jacket 30 may include one or more protuberances such as a posts 31 that insert into an aperture or hole 13 in the valve body 12 as illustrated in FIGS. 5, 6, and 8 to aid in securing the jacket 30 relative to the valve body 12.

Figure 12A:
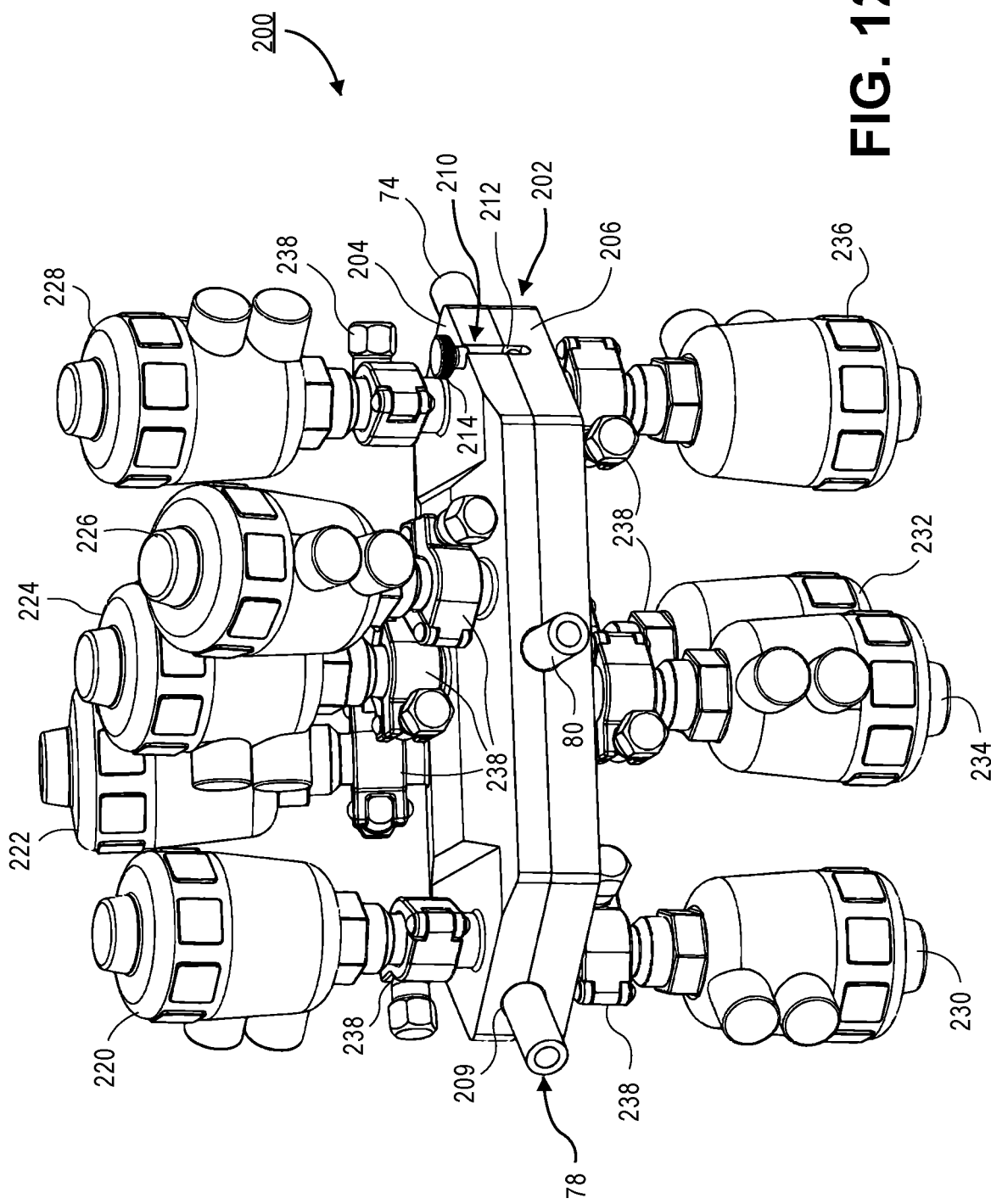
FIG. 12A illustrates another embodiment of a valve assembly that completely encapsulates the loop portion of the flexible conduit in the valve body. The valve body is illustrated in a closed state.
Figure 12B:
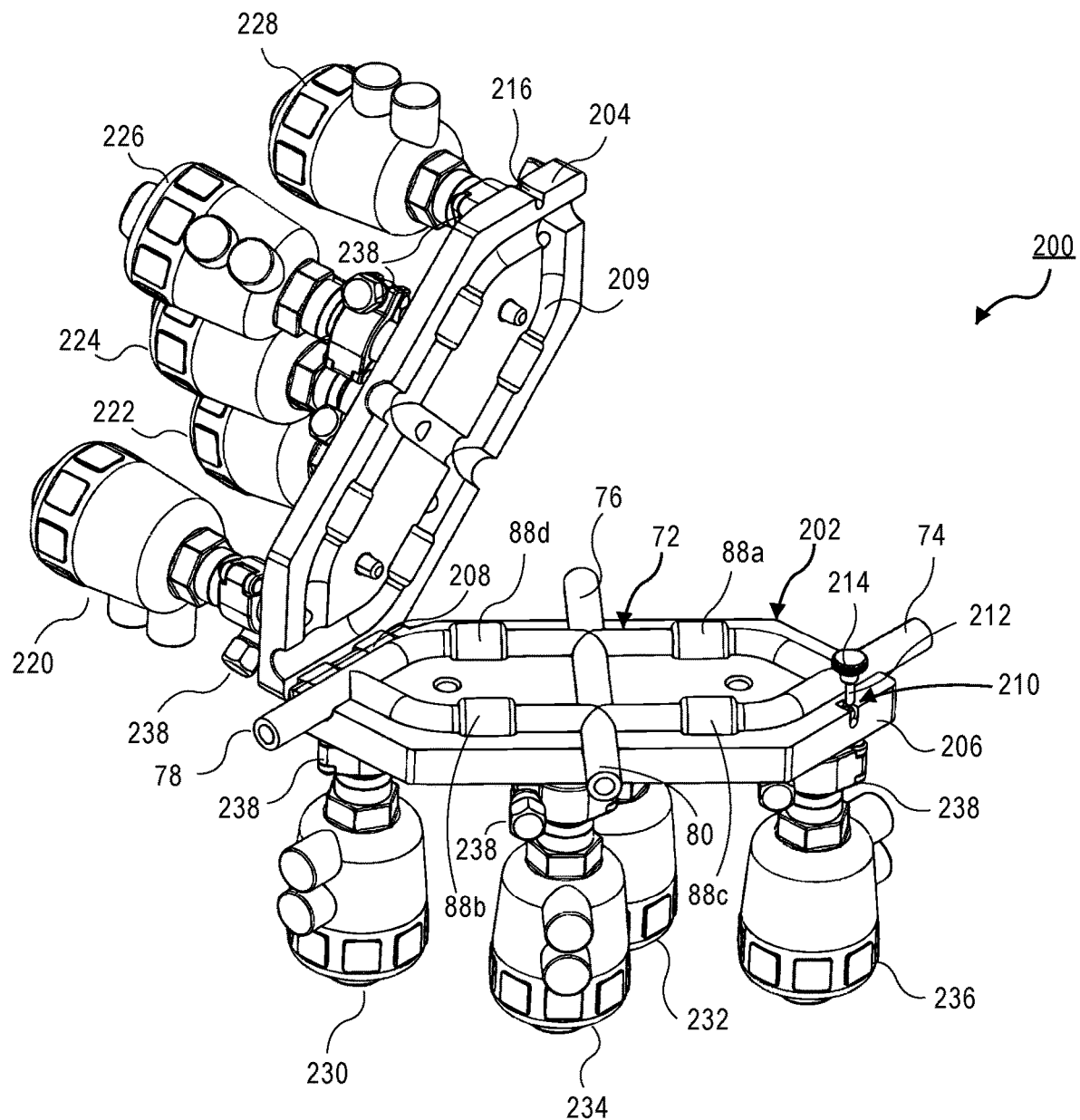
FIG. 12B illustrates another embodiment of a valve assembly that completely encapsulates the loop portion of the flexible conduit in the valve body. The valve body is illustrated in an open state.

In yet another alternative embodiment, the jackets 30 may not interface with the interior of the valve body 12 and may merely abut against an outer surface thereof (or be located adjacent to an edge of the valve body 12). In still another embodiment, the jackets 30 may be omitted entirely and the valve body 12 is made larger to hold the entire loop portion 72 of the flexible conduit 70. This embodiment is illustrated in FIGS. 12A and 12B.

Referring back to FIG. 1, in this particular embodiment, there are five (5) separate valves 50, 52, 54, 56, 58 that are secured to the first valve body portion 14 of the valve body 12. These valves are referred to as first valve 50, second valve 52, third valve 54, fourth valve 56, and fifth valve 58. While the valves 50, 52, 54, 56, 58 are illustrated being secured to the first valve body portion 14, they could also be secured to the second body portion 16 or they could be located on both portions 12, 14 (e.g., in order to provide more space between valves). As explained herein, the valves 50, 52, 54, 56, 58 are used to selectively pinch the flexible conduit 70 that is contained within the valve body 12. In the illustrated embodiment, each valve 50, 52, 54, 56, 58 is secured to the valve body 12 using a clamp 60, although the clamp 60 is optional and in some other embodiments, the valves 50, 52, 54, 56, 58 may be secured to the valve body 12 directly.

Each valve 50, 52, 54, 56, 58 includes an actuator 62 that includes a pinching element 64 that moves in the direction of arrow A (FIG. 9) to selectively close/open the central lumen 71 of the flexible conduit 70. The actuator 62 may be moved using any number approaches. For example, the actuator 62 may be pneumatically actuated valves using air ports 66 (connected to air lines; not shown). The actuator 62 may also be manually advanced/retracted using a bonnet or the like that is rotated. The actuator 62 may also actuated using a manually-activated toggle-type mechanism that does not require rotation of a bonnet or the like. This enables one to rapidly switch the valve between on/off states. The actuator 62 may also be actuated with an electrically driven motor or servo. Typically, the valves 50, 52, 54, 56, 58 are automatically controlled using off-valve electronics to control the opening/closing states. For example a solenoid located in a separate control panel assembly (not shown) is used to control air flow to the air ports 66 to turn on/off valves 50, 52, 54, 56, 58.

Figure 4:
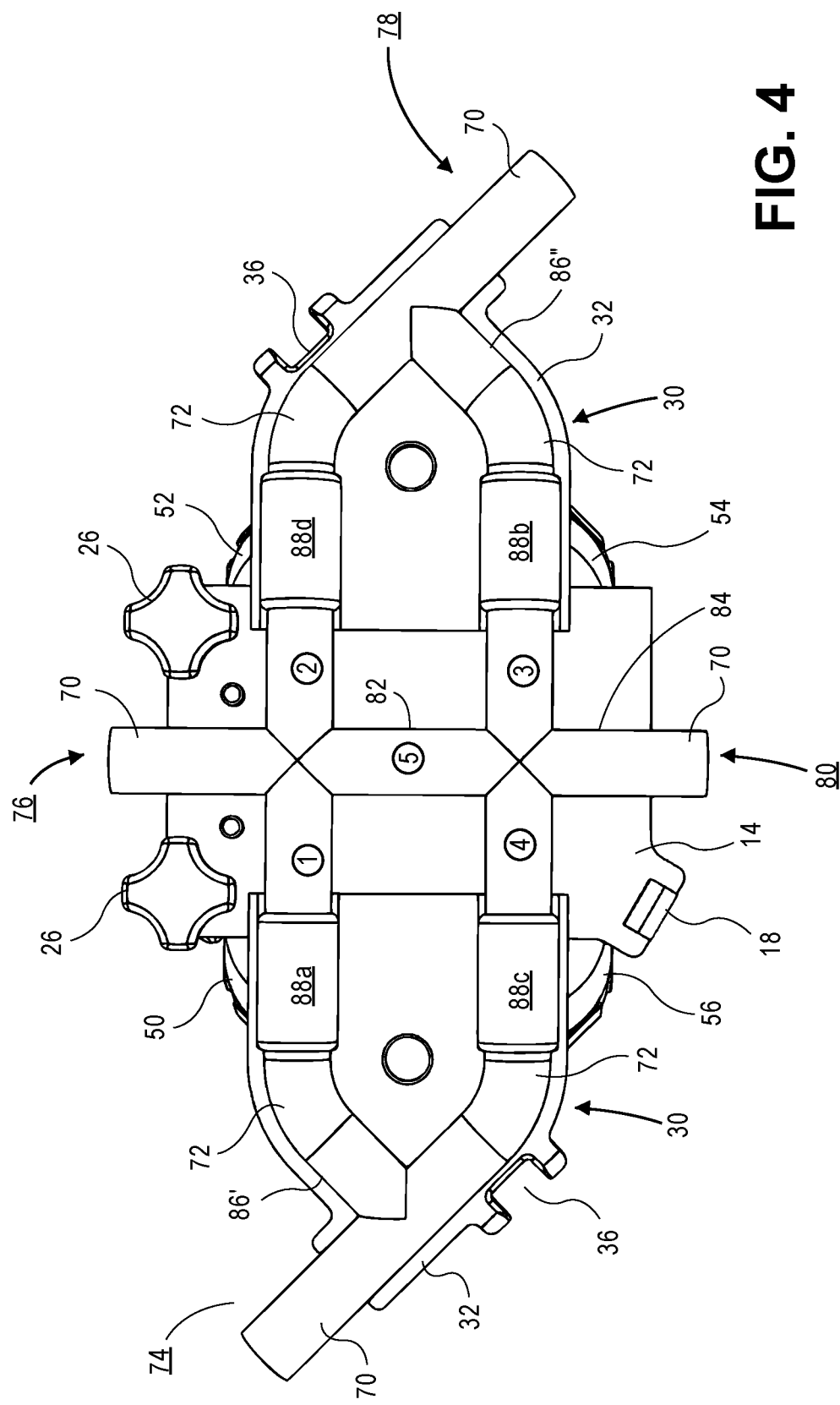
FIG. 4 illustrates a bottom view of the valve assembly of FIG. 1 with one half of the valve body removed to illustrate the flexible conduit therein. Also removed in this view are respective halves of the rigid jackets.
Figure 10:
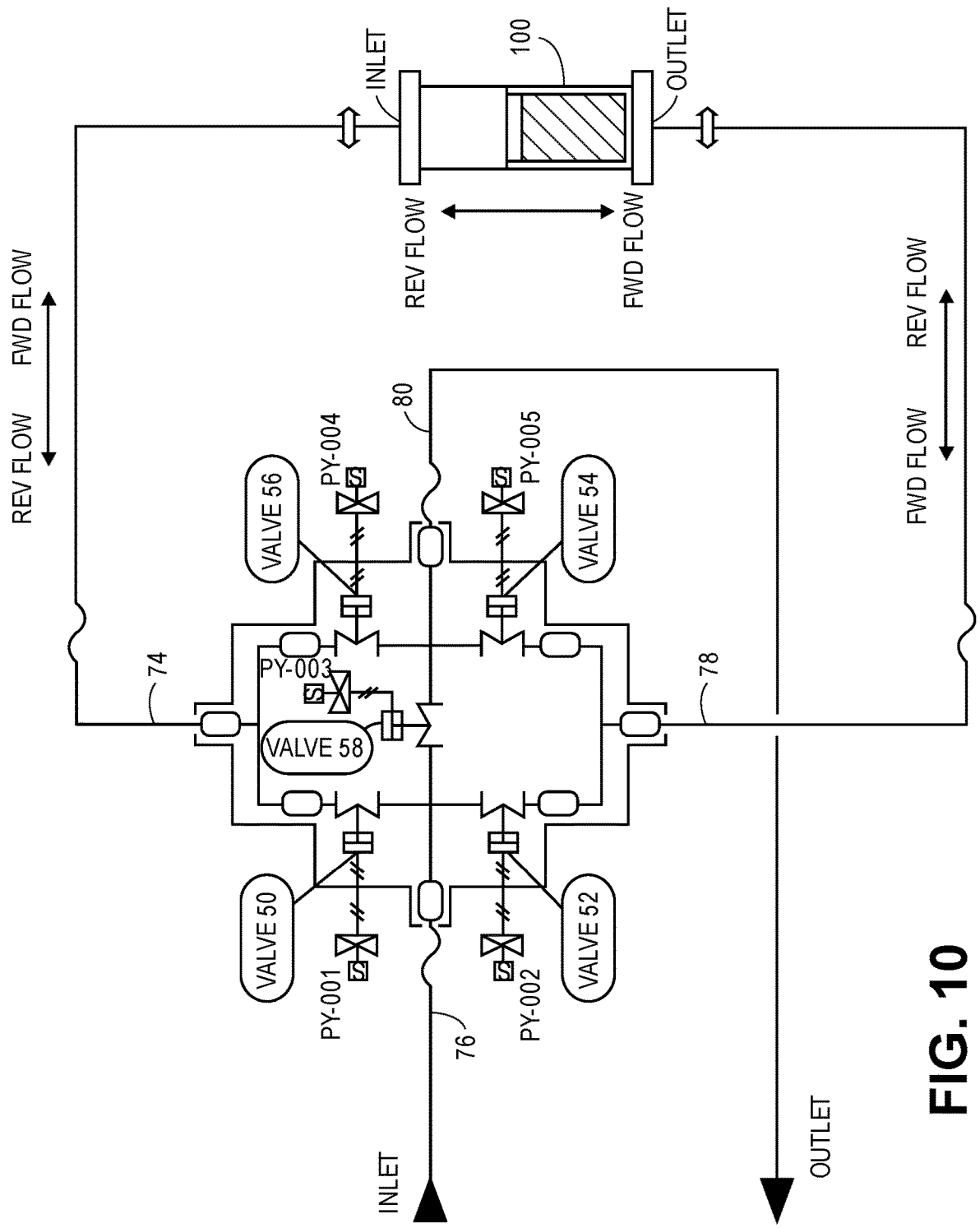
FIG. 10 illustrates a piping and instrumentation drawing for use of the valve assembly in connection with a chromatography column.

With reference to FIGS. 4, 5, and 10 the first valve 50 actuates pinching element 64 that passes through an aperture 65 located in the first valve body portion 14 to pinch the flexible conduit 70 at closure point #1 as seen in FIG. 4. Closure point #1 is located between the first branch 74 and the second branch 76. The second valve 52 actuates pinching element 64 that passes through an aperture 65 located in the first valve body portion 14 to pinch the flexible conduit 70 at closure point #2. Closure point #2 is located between the second branch 76 and the third branch 78. The third valve 54 actuates pinching element 64 that passes through an aperture 65 located in the first valve body portion 14 to pinch the flexible conduit 70 at closure point #3. Closure point #3 is located between the third branch 78 and the fourth branch 80. The fourth valve 56 actuates pinching element 64 that passes through an aperture 65 located in the first valve body portion 14 to pinch the flexible conduit 70 at closure point #4. Closure point #4 is located between the fourth branch 80 and the first branch 74. The fifth valve 58 actuates pinching element 64 that passes through an aperture 65 located in the first valve body portion 14 to pinch the flexible conduit 70 at closure point #5. Closure point #5 is located in the connector segment 82.

FIG. 10 illustrates a piping and instrumentation drawing for using the valve assembly 10 in connection with a chromatography column 100. In this embodiment, the chromatography column 100 can operate either with a forward flow or a reverse flow. With reference to the valve assembly 10 of FIG. 1, the first branch 74 of the flexible conduit 70 is connected to the inlet port connection on the chromatography column 100. The third branch 78 of the flexible conduit 70 is connected to the outlet port of the chromatography column 100. Fluid from the pharmaceutical or bioprocess operation (e.g., feed pump and upstream instrumentation) enters the valve assembly 10 via the second branch 76 of the flexible conduit 70 and exits the valve assembly 10 via the fourth branch 80 (see FIG. 2) of the flexible conduit 70 (downstream (effluent) instrumentation). In FIG. 10 PY-001, PY-002, PY-003, PY-004, PY-005 illustrate solenoid valves associated with each of the valves 50, 52, 54, 56, 58.

During operation of the chromatography column 100 where forward flow is used such as during column packing or normal capture mode, the valves 50, 52, 54, 56, 58 are in the open/closed state according to Table 1 below.

TABLE 1

| Forward Flow | |
| --- | --- |
| Valve | State (Open/Closed) |
| Valve 50 | Open |
| Valve 52 | Closed |
| Valve 54 | Open |
| Valve 56 | Closed |
| Valve 58 | Closed |

During operation of the chromatography column 100 where reverse flow is used such as during column cleaning or expanded bed processes, the valves 50, 52, 54, 56, 58 are in the open/closed state according to Table 2 below.

TABLE 2

| Reverse Flow | |
| --- | --- |
| Valve | State (Open/Closed) |
| Valve 50 | Closed |
| Valve 52 | Open |
| Valve 54 | Closed |
| Valve 56 | Open |
| Valve 58 | Closed |

During operations where the chromatography column 100 needs to be bypassed, the valves 50, 52, 54, 56, 58 are in the open/closed state according to Table 3 below.

TABLE 3

| Bypass Flow | |
| --- | --- |
| Valve | State (Open/Closed) |
| Valve 50 | Closed |
| Valve 52 | Closed |
| Valve 54 | Closed |
| Valve 56 | Closed |
| Valve 58 | Open |

FIG. 11 illustrates a valve assembly 10 that is used in an exemplary high pressure process. In this embodiment, the flexible tubing 70 that is located exterior to the valve assembly 10 is itself surrounded by separate jackets 120. The jackets 120 may be formed from first and second halves that surround the flexible tubing 70 and can be locked into place using a fastener (like those described herein with respect to the valve assembly 10), press-fit arrangement, or the like. The jackets 120 may be made from a suitably hard material such as metal or a polymer material (such as those described herein) to act as an exoskeleton-type structure to contain the flexible tubing 70 and prevent an "aneurysm" like failure of the flexible tubing 70 in response to carrying high pressure fluids. The jackets 120 may be modular and connected to one another (or other process components) so that there are no exposed regions of flexible tubing 70. Clamps 122 (one is shown in FIG. 11) may be used to connect adjacent jackets 120 or jackets 120 may include fittings used to connect the various components. The jackets 120 may have a number of sizes and shapes to orderly arrange the flexible tubing 70 according to the process in which they are used.

FIGS. 12A and 12B illustrate another embodiment of a valve assembly 200. In this embodiment, the valve assembly 200 includes a valve body 202 that includes a first body portion 204 and second body portion 206 that are connected to one another via one or more hinges 208. The valve body 202 and the respective portions 204, 206 are typically made from a metallic material (e.g., stainless steel) but it could also be formed from a suitably hard plastic material. In this embodiment, the entire loop portion 72 (FIG. 12B) of the flexible conduit 70 is contained within the valve body 202. Thus, in this embodiment, there are no rigid jackets that are used to encapsulate portions of the loop portion 72 of the flexible conduit 70. In this embodiment, the inner facing surfaces of the first body portion 204 and the second body portion 206 each define respective semi-annular or semi-circular passageways that, when brought together in the closed state, define a passageway 209 (e.g., circular shaped passageway) that holds the loop portion 72 of the flexible conduit 70. The valve body 202 can be secured in the closed state using one or more fasteners 210 as described herein. The fasteners 210 may include a pivoting latch 212 that has threads on which a knob 214 rotates that can be tightened and/or loosened to selectively close/open the valve body 202. The pivoting latch 212 may be rotated into a notch 216 (FIG. 12B) or the like located on the first and second body portions 204, 206 and the knob 214 is tightened to maintain the valve body 202 in the closed state. Conversely, the knob 214 can be loosened and the pivoting latch 212 rotated out from the notch 216 to enable the valve body 202 to be opened via the one or more hinges 208.

In this embodiment, there are nine (9) separate valves 220, 222, 224, 226, 228, 230, 232, 234, 236 that are secured to valve body 202. In the illustrated embodiment, five (5) of these valves 220, 222, 224, 226, 228 are secured to the first body portion 204 while the remaining four (4) valves 230, 232, 234, 236 are secured to the second body portion 206. Each valve 220, 222, 224, 226, 228, 230, 232, 234, 236 is secured to the valve body 202 via a clamp 238, although the clamp 238 is optional and in some other embodiments, the valves 220, 222, 224, 226, 228, 230, 232, 234, 236 may be secured to the valve body 12 directly. The valves 220, 222, 224, 226, 228, 230, 232, 234, 236 may any type of valve as described herein and each is used to selectively pinch the flexible conduit 70 that is contained within the valve body 202. Each valve 220, 222, 224, 226, 228, 230, 232, 234, 236 includes an actuator and pinching element (not illustrated) as described previously herein in prior embodiments to selectively close/open the central lumen 71 of the flexible conduit 70.

In this embodiment, the valves 220, 222, 224, 226, 228, 230, 232, 234, 236 are located to provide closure points as illustrated in FIG. 7F. Thus, in this embodiment, by placing the closure points 92*a*, 92*b*, 92*c*, 92*d*, 92*e*, 92*f*, 92*g*, 92*h*, 92*i* near intersecting flow paths in the loop portion 72 of the flexible conduit 70 potential holdup volume is reduced or eliminated in the legs or segments of the double cross segment 84 or the first or second Y or TEE segments 86', 86" as illustrated in FIG. 7F (the volume between closure points 92*f*-92*b*, 92*h*-92*a*, 92*i*-92*c*, 92*d*-92*g* can be isolated from fluid). Further, in this embodiment, the valves 220, 222, 224, 226, 228, 230, 232, 234, 236 are positioned on both sides of the valve body 202 which provides adequate room to mount the nine valves 220, 222, 224, 226, 228, 230, 232, 234, 236. In this embodiment, two valves 228, 232 can be closed to isolate the flow path between the first branch 74 and the second branch 76. Another two valves 222, 230 can be closed to isolate the flow path between the second branch 76 and the third branch 78. Another two valves 220, 234 can be closed to isolate the flow path between the third branch 78 and the fourth branch 80. Another two valves 226, 236 can be closed to isolate the flow path between the fourth branch 80 and the first branch 74. A single valve 224 is used to close the flow path in the connector segment 82 (e.g., bypass pathway).

One advantage of the valve assemblies 10, 200 described herein is that they are relatively compact and can be positioned as well as opened and closed by hand without the need for complicated mounting structures or tooling. In addition, valve assemblies 10, 200 permit one to quickly replace the flexible conduit 70 with another replacement flexible conduit 70. In applications were sterility or aseptic conditions are needed, the flexible conduit 70 can be swapped out and replaced with a new flexible conduit 70. This can take place with quickly by opening the valve assembly 10, 200 using the fasteners 22, 210, removing the old or disposable flexible conduit 70 and inserting a new flexible conduit 70 into the valve assembly 10, 200 and closing the valve assembly 10, 200 using the fasteners 22, 210. Not only is the valve assembly 10, 200 relatively compact, it can optionally be used with additional jackets 120 that can be used to direct and manage the flexible conduit 70 in multiple dimensions to other process units or components.

While embodiments of the present invention have been shown and described, various modifications may be made without departing from the scope of the present invention. For example, while the valve assemblies 10, 200 has been described as being used in connection with a chromatography column, the valve assembly 10, 200 can be used in any application where flow reversal and bypass are needed. As another example, while the flexible conduit 70 containing the loop portion 72 is illustrated as having four branches 74, 76, 78, 80 there could be more branches coupled to the loop portion 72. In such a configuration there would be additional valves added to the valve assembly. In addition, while the nine (9) valve embodiment of FIGS. 12A and 12B is illustrated containing the entire loop portion 72 in the valve body 202, the five (5) valve embodiment of FIGS. 1-6 could also be constructed such that the entire loop portion 72 is within the valve body 12 whereby there would be no rigid jackets 30. In addition, it should be understood that while various embodiments are described herein various feature of one embodiment may be combined or used with another embodiment. That is to say, features of one embodiment may be substituted or used in another embodiment. The invention, therefore, should not be limited, except to the following claims, and their equivalents.

What is claimed is:

1. A valve assembly with a multidirectional flow path comprising:

a valve body comprising a first body portion and a second body portion connected to one another at one or more hinges, the first body portion and the second body portion defining respective passageways extending through the valve body when in a closed state;

a flexible conduit having at least a portion thereof extending through the passageways of the valve body, the flexible conduit comprising a loop contained within the valve body and connected to a first branch, a second branch, a third branch, and a fourth branch, wherein the second and fourth branches are fluidically connected to one another across the loop portion via a connector segment;

a first valve disposed on the valve body and having an actuator configured to actuate a pinching element to pinch the flexible conduit loop between the first branch and the second branch;

a second valve disposed on the valve body and having an actuator configured to actuate a pinching element to pinch the flexible conduit loop between the first branch and the second branch;

a third valve disposed on the valve body and having an actuator configured to actuate a pinching element to pinch the flexible conduit loop between the second branch and the third branch;

a fourth valve disposed on the valve body and having an actuator configured to actuate a pinching element to pinch the flexible conduit loop between the second branch and the third branch;

a fifth valve disposed on the valve body and having an actuator configured to actuate a pinching element to pinch the flexible conduit loop between the third branch and the fourth branch;

a sixth valve disposed on the valve body and having an actuator configured to actuate a pinching element to pinch the flexible conduit loop between the third branch and the fourth branch;

a seventh valve disposed on the valve body and having an actuator configured to actuate a pinching element to pinch the flexible conduit loop between the fourth branch and the first branch;

an eighth valve disposed on the valve body and having an actuator configured to actuate a pinching element to pinch the flexible conduit loop between the fourth branch and the first branch;

a ninth valve disposed on the valve body and having an actuator configured to actuate a pinching element to pinch the flexible conduit in the connector segment; and at least one fastener configured to secure the valve body in a closed state.

2. The valve assembly of claim 1, wherein the valve body comprises a metal material.

3. The valve assembly of claim 1, wherein the flexible conduit loop is made from three separate flexible tubing pieces that are bonded together.

4. The valve assembly of claim 3, wherein the flexible conduit loop comprises a double cross piece bonded to two TEE pieces at four (4) interface locations.

5. The valve assembly of claim 4, wherein the four (4) interface locations each comprise overmolded sections of flexible conduit.

6. The valve assembly of claim 1, wherein the valve body comprises a plastic or polymer material.

7. The valve assembly of claim 1, wherein the first through ninth valves are disposed on both the first and second body portions.

8. The valve assembly of claim 1, wherein the flexible conduit loop is pinched by respective pinching elements of the first through ninth valves at non-overmolded sections.

* * * * *